May 28, 1968  R. T. FELD ET AL  3,385,680
FLUID BLENDING SYSTEM
Filed Oct. 25, 1962  10 Sheets-Sheet 9
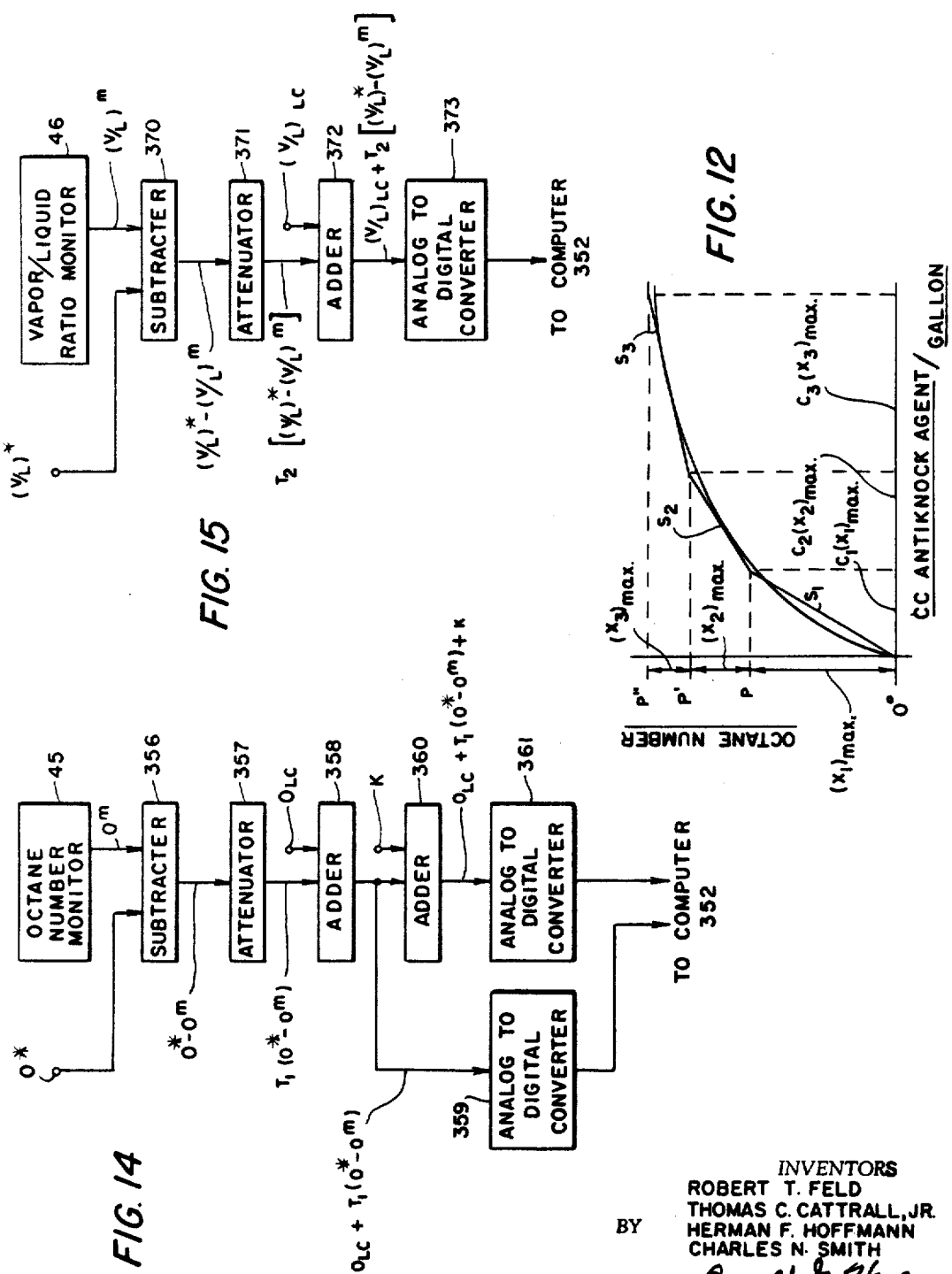
INVENTORS
ROBERT T. FELD
THOMAS C. CATTRALL, JR.
HERMAN F. HOFFMANN
CHARLES N. SMITH
BY
Oswald F. Hayes
ATTORNEY

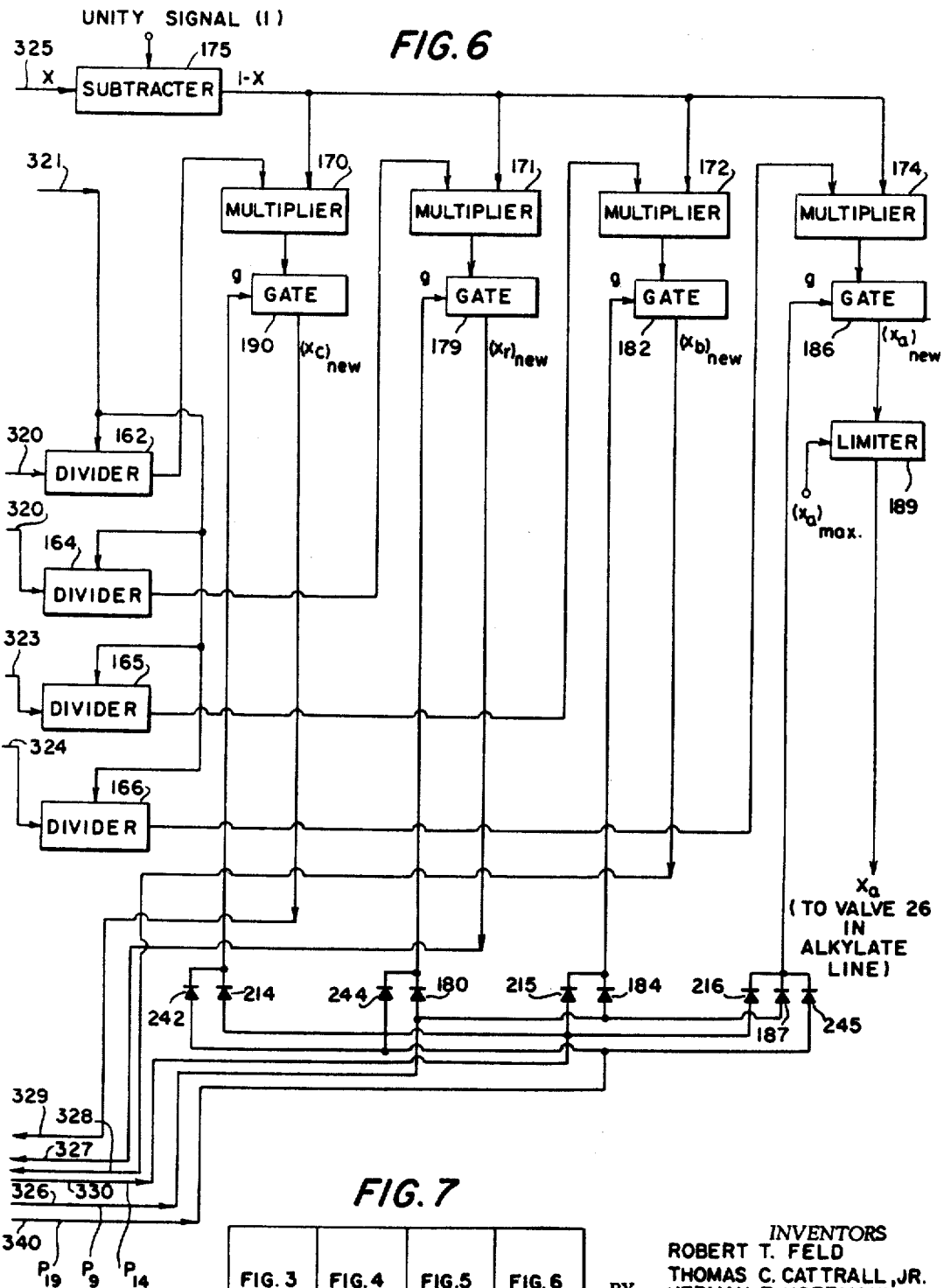

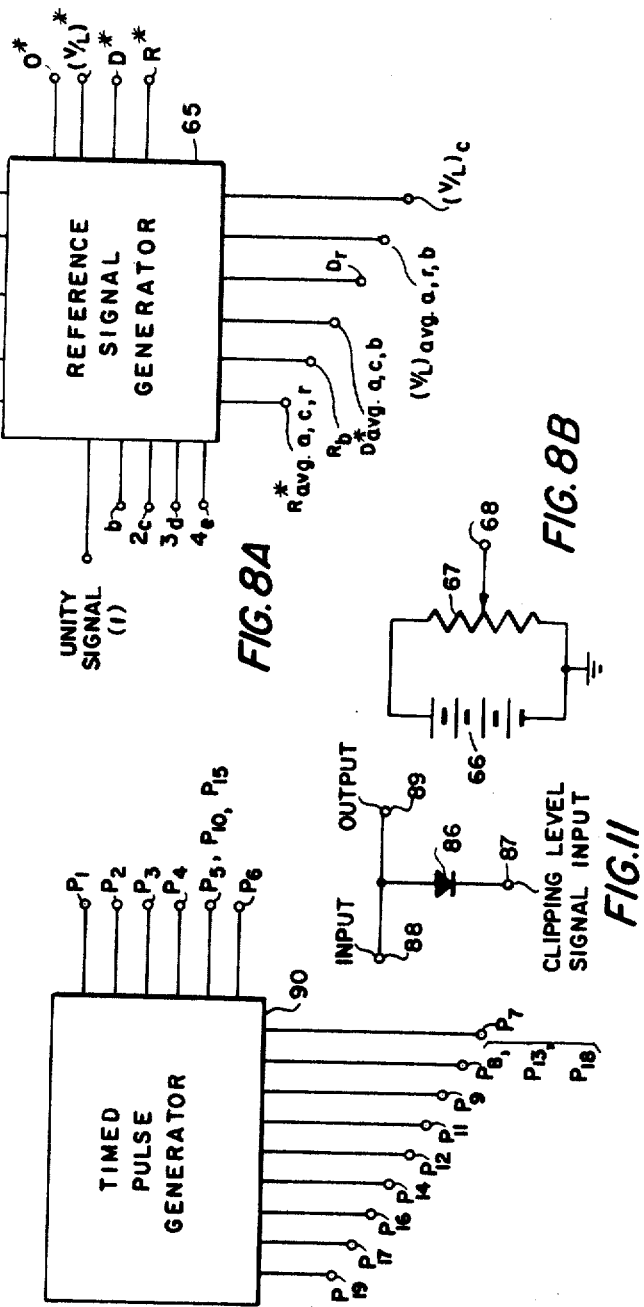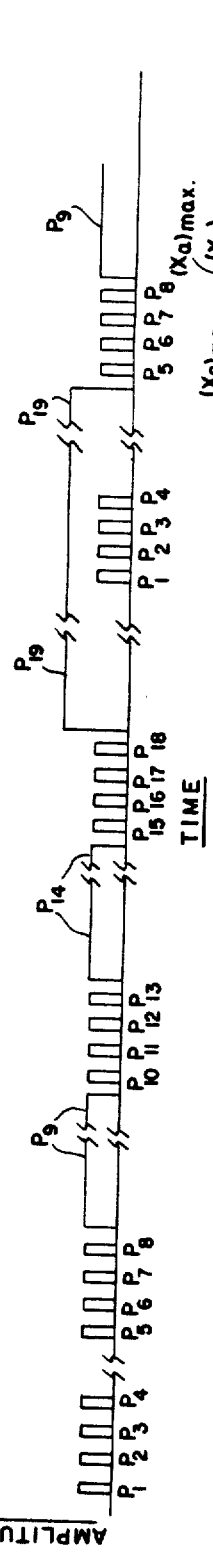

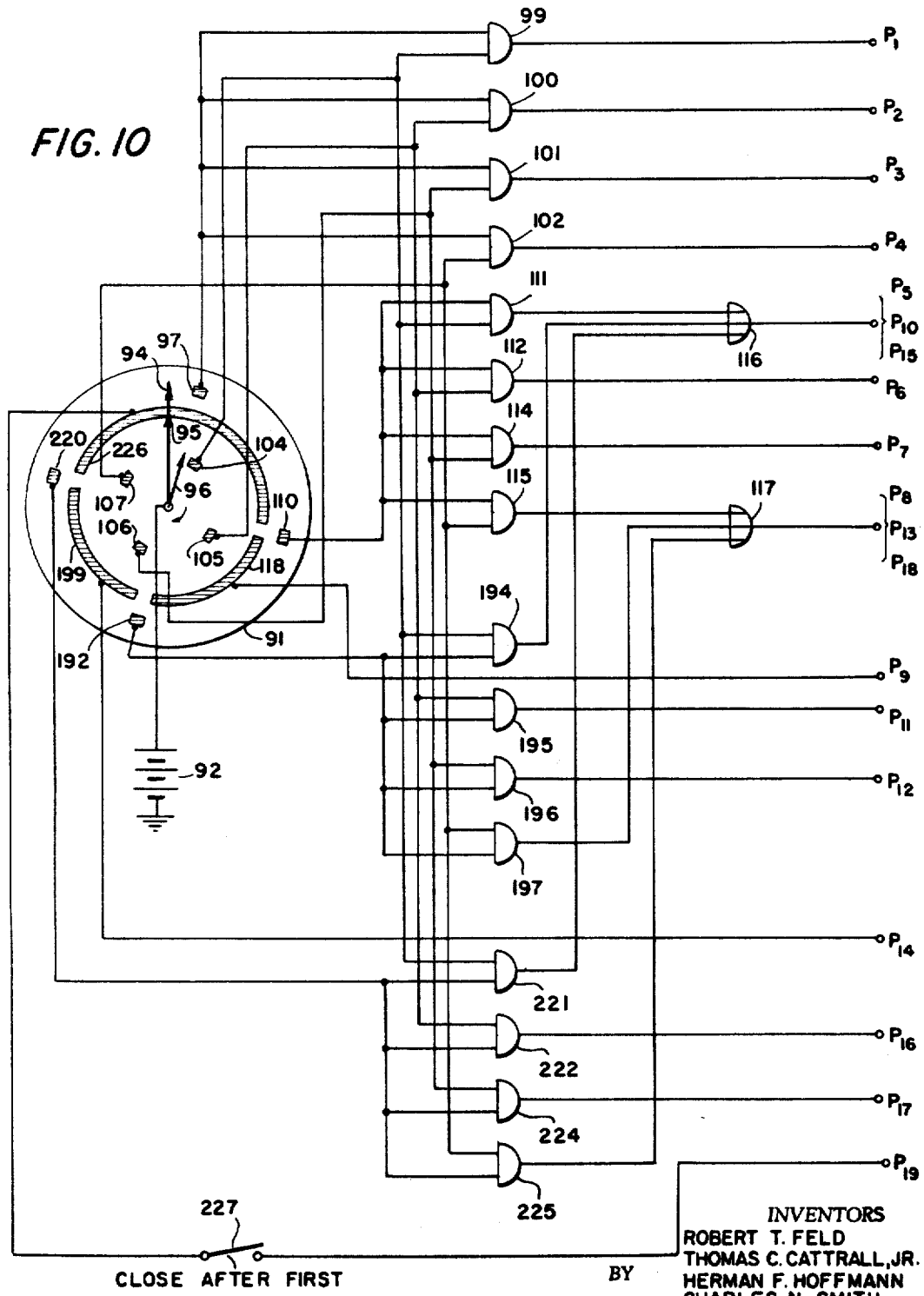

United States Patent Office 3,385,680
Patented May 28, 1968

3,385,680
FLUID BLENDING SYSTEM
Robert T. Feld, Pitman, N.J., Thomas C. Cattrall, Jr., Huntington, N.Y., and Herman F. Hoffmann, Wenonah, and Charles N. Smith, Woodbury, N.J., assignors to Mobil Oil Corporation, a corporation of New York
Filed Oct. 25, 1962, Ser. No. 232,970
15 Claims. (Cl. 44—2)

This invention relates to fluid blending techniques and, more particularly, to a system for automatically blending a fuel from a plurality of fuel components.

In a refinery where different base stocks or fuel components are continuously produced and blended in varying quantities, qualities, and unit costs, it is necessary to modify the blending of these components from time to time to compensate for their variations and to maintain a blended fuel that meets specifications. In accordance with typical blending procedures, the base stocks are channeled to storage tanks from which they are later taken to be blended in a batch blending process in a large storage tank, or they are blended directly in a pipeline that leads directly to distribution equipment. In either case, the fuel is blended to formula and is repeatedly sampled and tested to determine whether the blend is meeting specifications.

Conventional blending procedures involve inefficient expedients. For example, the sampling and testing techniques employed to determine the characteristics of the blend are operations usually performed by hand, i.e., withdrawing a sample from the blend, transporting it to a laboratory, testing the sample, conveying information concerning the properties of the sample to an operator, and varying one or more of the components of the blend to bring the blend to specifications.

Because all these steps are carried out manually, there is an appreciable lag between the time at which a fuel is detected as being off-specification and the time at which a consequent correction is made. Thus the batch blending of fuel proceeds inefficiently, with corrections being made well after specification deviations are noted and with the product approved for shipment only after repeated testing. Further, the direct blending of fuel components in an in-line blending system leading directly to a distribution setup is rendered largely impractical, since deviations from specifications may be undetected for substantial periods during which the off-specification product is piped to the distribution medium. The resulting uncorrectable error sometimes necessitates the costly sale of the product as a lower quality material, involving a significant loss in revenue.

There is also a real problem connected with a positive variation from specification. For example, the costs of octane number improvements at current quality levels are very significant. Typical wholesale prices of gasoline indicate a cost of 10 cents per barrel for each octane number increase over a specified reference. Since gasoline production in a typical large refinery is over 100,000 barrels per day, the cost of an extra octane number approximates $10,000 per day. It can be appreciated, therefore, that without continuous monitoring and control, the blending of a gasoline at an additional one half or whole octane number to ensure that the product meets specification is very expensive.

The interdependence of the variables involved in fuel blending further complicates the control of a blending process. For example, in gasoline blending as the amount of a particular blend component is changed to correct for a specification deviation in volatility, for example, this change will also affect the octane number of the blend, as well as other blend characteristics. Thus, any blending control must recognize and correct for this interdependence.

In addition, the components normally blend non-linearly with regard to particular characteristics. This further complicates computations regarding corrections to be made to meet quality specifications.

The present invention provides a system for automatically blending a finished fuel product from a plurality of fuel component products in accordance with a plurality of variable characteristics of the products and other criteria. Specifically, a number of characteristics of the products are continuously monitored, and the blending process is continually modified in accordance with detected changes therein so that the fuel always meets specifications and other criteria, and deviations from specifications are compensated for immediately. In addition, provision is made to divert the blended product from its normal course of flow if that product deviates by more than predetermined prescribed limits from any one or more of the specifications, thereby to avoid distributing the blended product to a distribution system, for example, wherein no correction can be made for the deviation. Further, the interdependence of product characteristics and their non-linearities are accounted and compensated for.

This is accomplished in the present invention by employing automatic monitors to determine the characteristics of the blended product, as well as the component products in some instances. For example, octane number, vapor/liquid ratio, one or more of a number of distillation points, and Reid vapor pressure are determined. Signals from the monitors are applied to a computer which is programmed with information concerning the specifications of the blend, limitations on the components, and other refinery data, such as cost and availability, for example. Deviations from specifications, accordingly, are handled by the computer and signals are generated which are used to control the flow of components in the blending area so that the limitations regarding specifications and components, among others, are adhered to. Further, cost data, for example, provides a limitation on the use of components or is used as a basis for computing an optimal blend, i.e., one that minimizes costs. Additionally, automatic detecting devices are employed to detect drastic deviations from specifications and, in the event that such deviations occur, the blended product is rerouted from its normal course of flow, for example, to special storage. Further, positive provision is made to account for the interdependence and non-linearity of product characteristics, and the control scheme is provided with a feature which limits the corrections that can be made, thereby to avoid "hunting" and wide variations of component flows and to render the system stable.

A detailed description follows of the invention described generally above, which is to be read in conjunction with the appended drawings, in which.

Figure 13:
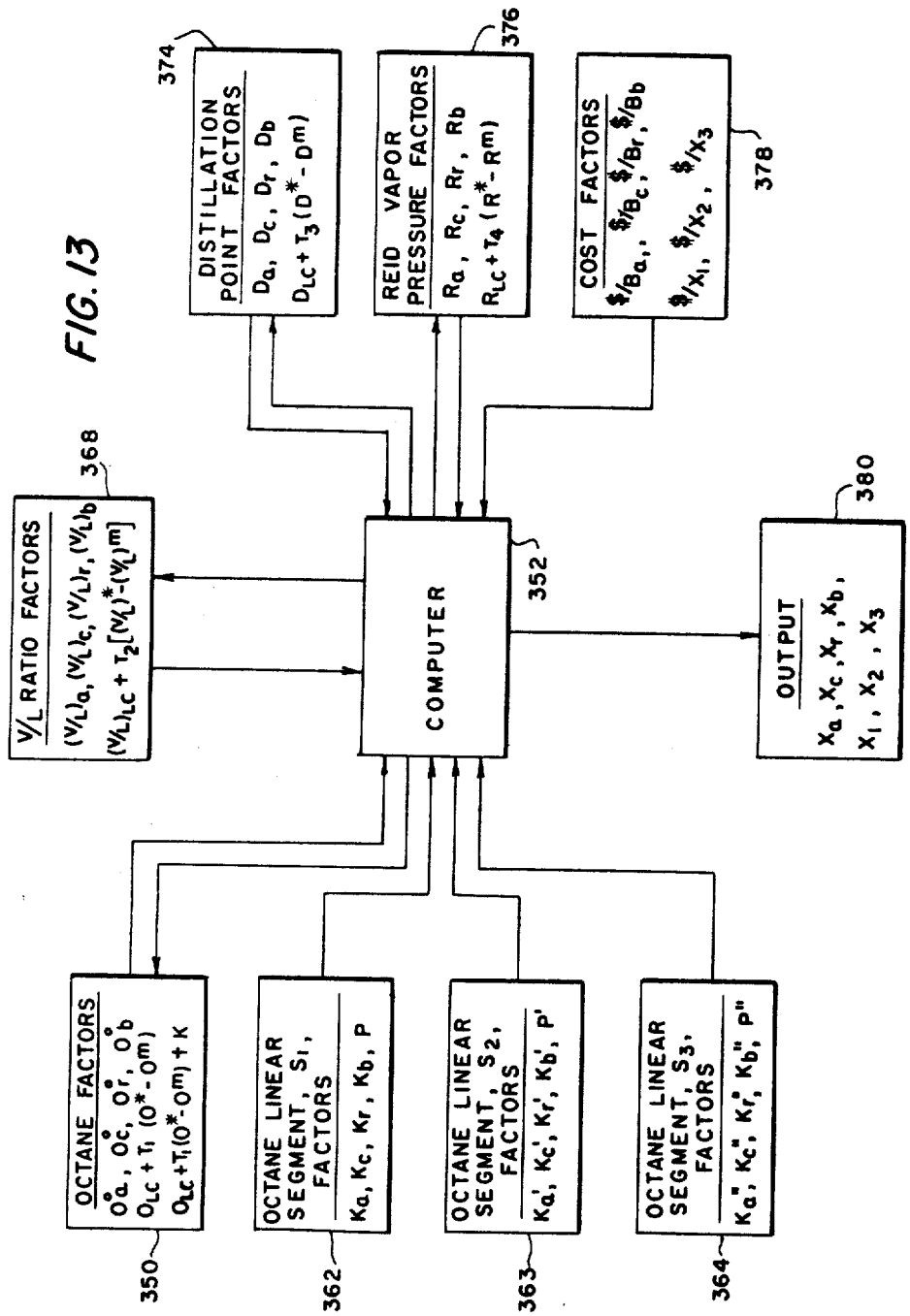

FIGS. 3, 4, 5 and 6 when arranged according to FIG. 7, are a single block diagram of a portion of a system in accordance with the invention that regulates the blending of the fuel in accordance with the vapor/liquid ratio, the distillation point, and the Reid vapor pressure of the finished blend;

FIG. 8A is a block diagram of a reference signal generator useful in the system shown in FIGS. 2 through 6;

FIG. 8B is a detailed circuit diagram of a representative portion of the reference signal generator of FIG. 8A;

FIG. 9A is a block diagram of a time pulse generator useful in the system shown in FIGS. 2 through 6;

FIG. 9B is a pulse waveform diagram showing the times of occurrence of the pulses produced by the timed pulse generator of FIG. 9A;

FIG. 10 is a detailed schematic diagram of the timed pulse generator of FIG. 9A;

FIG. 11 is a detailed schematic diagram of an exemplary form of limiter employed in the circuits of FIGS. 2 through 6, inclusive;

FIG. 12 is a typical anti-knock agent susceptibility curve showing octane number of a blended fuel versus the concentration of anti-knock agent;

FIG. 13 is a block diagram of another system in accordance with the invention; and FIGS. 14 and 15 are block diagrams of circuits useful in the system of FIG. 13.

In the following detailed description of an exemplary embodiment of the invention, reference will be made to certain well known computer elements including GATES, MEMORIES, ADDERS, SUBTRACTERS, MULTIPLIER, LIMITERS, and DELAY devices in labeled rectangles, as well as AND and OR gates indicated by conventional computer symbols, each of which may take any suitable conventional form, the details of which are not intended as a part of the present invention.

Certain portions of the system involve techniques and include apparatus which may be the same as or similar to techniques and apparatus disclosed and claimed in copending applications Ser. Nos. 233,007, now Patent No. 3,276,460, 235,060, and 239,505, filed Oct. 25, 1962, Nov. 2, 1962, and Nov. 23, 1962, respectively, for Fluid Monitoring and Blending Control, Blending System, and Fuel Blending System, respectively, all assigned to the assignee of the present application. These techniques and apparatus, where claimed in the copending applications, are inventions properly attributable to the inventors of such applications and form no part of the present invention.

GENERAL BLENDING SYSTEM

Figure 1:
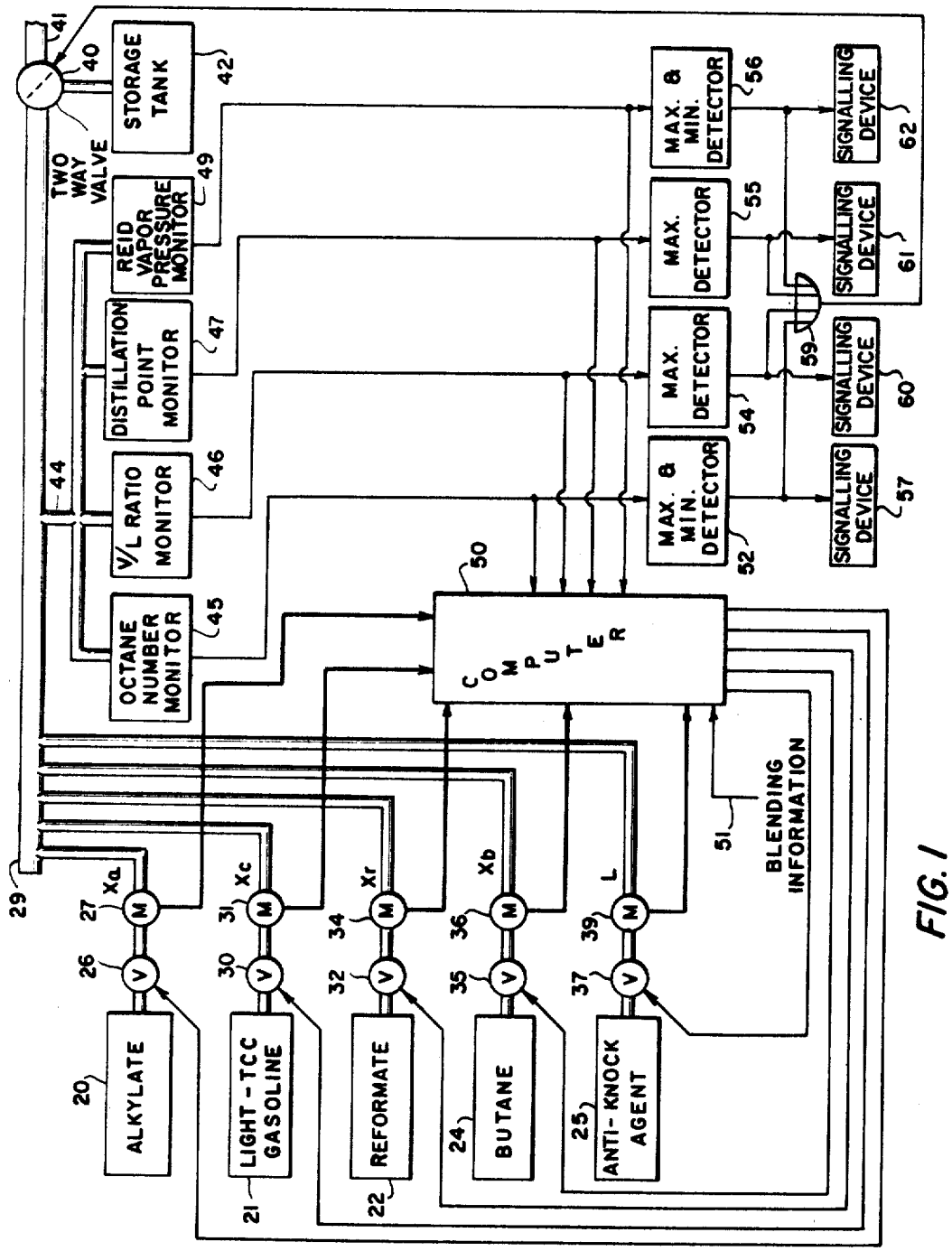
FIG. 1 is a block diagram of a fuel blending system in accordance with the invention.

FIG. 1 shows a system for blending a finished fuel product from a plurality of fuel component products in accordance with a plurality of characteristics of the products to meet a plurality of specifications and other criteria. For the purpose of illustration, a system for blending a motor fuel such as a premium grade of automobile gasoline is shown. Thus, in the example chosen, the blended fuel is typically formed from five different component products, which include alkylate from a source of supply 20, light Thermofor Catalytic Cracked (TCC) gasoline from a source of supply 21, reformate from a source of supply 22, butane from a source of supply 24, and an anti-knock agent such as Tetraethyl Lead (TEL), for example, from a source of supply 25.

The alkylate supply 20 is coupled through an adjustable valve 26 and a meter 27 to a blending line 29. Likewise, the light TCC gasoline source 21 is coupled through an associated adjustable valve 30 and a meter 31 to the blending line 29. The remaining components are similarly coupled to the blending line 29: a valve 32 and a meter 34 couple the reformate source 22 to the blending line 29, a valve 35 and a meter 36 couple the butane source 24 to the blending line, and a valve 37 and a meter 39 couple the anti-knock agent source 25 to the blending line. The adjustable valves 26, 30, 32, 35 and 37 may be conventional solenoid valves selectively operated in the manner to be described hereinafter.

Within the blending line 29, the component products specified above are mixed or blended in proportions depending upon the settings of the valves 26, 30, 32, 35, and 37 to form a blended fuel product which is piped through a two-way solenoid valve 40 of any suitable conventional form to a pipeline 41 that leads to a fuel distribution system (not shown), such as a distribution header for branch pipelines to distribution centers or to a barge, or to a suitable storage facility (not shown). In the event that the blended fuel is drastically off-specification, it is diverted by the two-way valve 40 from its normal course of flow to the pipeline 41 to a storage tank 42, as will be explained later.

At a point in the blending line 29 downstream from the section in which the fuel components are blended, a tap 44 conducts a portion of the blended fuel to an octane number monitor 45, a vapor/liquid ratio monitor 46, a distillation point monitor 47, and a Reid vapor pressure monitor 49.

The octane number monitor 45 may comprise the standard ASTM-CFR knock test engine which provides a signal representative of knocking in the engine and, therefore, the octane number of the fuel under test. Preferably, however, the monitor 45 comprises apparatus of the type shown in either the co-pending application of William E. Beal, Ser. No. 160,051, filed Dec. 18, 1961, now Patent No. 3,238,765, for "Apparatus for Determining the Combustion Quality of a Fuel," or the co-pending application of Alfred E. Traver, Ser. No. 160,052, filed Dec. 18, 1961, now Patent No. 3,312,102, for "Automated Engine for Determining the Combustion Quality of a Fuel," both of which have a common assignee with the instant application. The apparatus in each of these applications develops a signal which is representative of the combustion quality of a fuel, e.g., the "knocking" quality or octane number of the fuel if it is a gasoline. The propensity of a gasoline to knock is an important measure of its performance. Thus, to produce a finished blend of gasoline that meets combustion quality specifications for the grade of gasoline involved, its octane number, which is inversely related to the propensity of the fuel to knock, must be maintained above a predetermined minimum value. At the same time, the octane number should not be allowed to exceed a predetermined maximum value, since costly quality giveaway would be incurred, thereby needlessly increasing the cost of the particular grade of gasoline and drastically reducing the profits of the refinery.

The vapor/liquid ratio monitor 46 is the same as that shown and described in the co-pending application Ser. No. 233,007 filed Oct. 25, 1962, now Patent No. 3,276,460, for "Fluid Monitoring and Blending Control," having a common assignee with the instant application, and generates a signal representative of the vapor/liquid ratio of the finished fuel blend. This ratio represents the volume of vapor divided by the volume of liquid of a fuel at a predetermined temperature and pressure with the liquid and vapor in equilibrium. At pressures and temperatures typical of automotive fuel systems, this is indicative of the propensity of the fuel to "vapor lock" in the fuel line of an engine. Thus, for any particular finished blend of gasoline, the vapor/liquid ratio must be maintained so that it does not exceed a predetermined maximum magnitude at a predetermined temperature.

The distillation point monitor 47 may be the same apparatus as that shown in Patents Nos. 2,339,026; 2,499,-105; and 2,594,683, for example, and generates a signal representative of a particular distillation point of the finished blend of fuel, for example, the 90% point, the 50% point, or the 10% point. Each such distillation point is an important factor in determining the performance characteristics of the finished blend. Thus, the 90% point, i.e., the temperature at which 90% of the fuel is evaporated, is a measure of the tail end volatility of the blend which affects engine combustion chamber deposits, induction system deposits, and crank case dilution. The 50% point is a measure of engine warmup and acceleration, as well as carburetor icing, and is a factor in vapor lock. The 10% point is a measure of engine warmup and ease of starting. Obviously, then, any particular one or more distillation points may be monitored to provide an indication of particular performance characteristics of the finished blend of gasoline.

The Reid vapor pressure monitor 49 may be the same as that shown in Patent No. 2,722,826, and generates a signal representative of the Reid vapor pressure of the finished blend of gasoline. Reid vapor pressure, as defined in American Society for Testing and Materials Method D323, is the vapor pressure of the finished fuel blend at 100° F. This is indicative of gasoline station dispensing pump characteristics and general performance and starting characteristics of the fuel in an engine. Further, the pressure must conform to legal limitations which are established for safety by federal and local agencies. Typically, the Reid vapor pressure should not exceed a predetermined maximum magnitude.

Thus the blended fuel is continuously monitored to determine its octane number, vapor/liquid ratio, distillation point, and Reid vapor pressure, and signals representative of this information are applied from the monitors 45, 46, 47, and 49 to a computer 50. The computer is also supplied with signals from the meters 27, 31, 34, 36, and 39, which are representative of the flow of fuel components into the blending line 29, as well as other signals applied via a multiple signal cable 51. The signals in the cable 51 relate to refinery and other data, such as component availability and cost and characteristics, for example. Signals representative of the component characteristics may be generated by monitors, such as monitors 45, 46, 47, and 49 that are coupled to each of the component lines that lead to the blending line 29.

Within the computer 50, the signals applied thereto are acted upon in accordance with an internal program of the computer to generate signals which are applied to the valves 26, 30, 32, 35, and 37 to control the flow of fuel components into the blending pipeline 29. Specifically, the valves are adjusted so that the finished blend of gasoline conforms to predetermined specifications, e.g., octane number, vapor/liquid ratio, distillation point, and Reid vapor pressure. Thus, these adjustments are made in accordance with the detected characteristics of the blended fuel so that the finished product meets specifications. In addition, the adjustments reflect the detected characteristics of the components as well as predetermined constraints established by the refinery and other data, so that changes are made efficiently and with due regard to costs. Advantageously, costs may be minimized, or may provide limitations on the use of components.

Each of the monitors 45, 46, 47, and 49 is also coupled to a corresponding detector 52, 54, 55, and 56, respectively, of any suitable conventional form. Thus, the octane number monitor 45 is coupled to a maximum and minimum detector 52 which generates a signal if the octane number of the finished blend of fuel exceeds a predetermined maximum or falls below a predetermined minimum. The detector 52, in this case, may comprise any pair of comparators (not shown), one of which generates an output signal if the input signal exceeds the predetermined maximum magnitude and the other one of which generates an output signal if the input signal falls below the predetermined minimum magnitude. Suitably biased electron tubes, for example, may suffice for this.

Should the detector 52 generate an output signal, a signalling device 57 is actuated to provide an audio, visual, or other type of alarm. In addition, the signal from the maximum and minimum detector 52 is applied to an OR gate 59 which is coupled to the two-way valve 40 to switch the valve so that the blending line 29 is no longer coupled to the pipeline 41 but, rather, is coupled to the storage tank 42. In this fashion, if the blended fuel deviates from its prescribed limits insofar as octane number is concerned, the off-specification fuel may be stored until the blend once again satisfies this specification.

Similarly, the maximum detector 54, which may comprise any well known comparator circuit (not shown) for generating an output signal if the input signal exceeds a predetermined maximum magnitude, is coupled to the vapor/liquid ratio monitor 46 and only generates a signal if the vapor/liquid ratio exceeds a predetermined maximum. In this event, a signalling device 60 is actuated and the two-way valve 40 is switched so that the off-specification fuel is routed to the storage tank 42. Likewise, the maximum detector 55, similar to the detector 54, is coupled to the distillation point monitor 47 and generates a signal to actuate an associated signalling device 61 and the two-way valve 40 only if the distillation point exceeds a predetermined maximum. Finally, the maximum and minimum detector 56, similar to the detector 52, is coupled to the Reid vapor pressure monitor 49 and generates a signal only if the Reid vapor pressure exceeds a predetermined maximum or falls below a predetermined minimum. In this event, a signalling device 62 is actuated, and the two-way valve 40 is switched.

BLENDING CONTROL.—DETAIL 1

FIG. 2 and FIGS. 3 through 6, when arranged according to FIG. 7, show in detail one exemplary system in accordance with the invention. The system blends fuel using the five basic fuel components of FIG. 1, and monitors the blended fuel as well as the components, if desired, to determine octane number, vapor/liquid ratio, distillation point, and Reid vapor pressure, although this is for the purpose of illustration only. Any changes necessary in blending are effected separately in accordance with each detected characteristic of the finished blend, and the changes proceed sequentially in continuing cycles.

For example, the blending is changed, if necessary, to correct for a deviation in the octane number of the finished blend from specification. In this regard, the change effected is purposely limited so that only a partial correction is made, thereby preventing wide fluctuations in blending and correcting for a deviation in successive steps. Following this, and at a time when the preceding change or partial correction has been effected and is reflected in the finished fuel blend, the blending is changed further, if necessary, to correct partially for a deviation in the vapor/liquid ratio of the blend from specification. Thereafter, and allowing time for the immediately preceding change to be reflected in the new blend, a still further change is made, if necessary, to correct partially for a deviation in the distillation point of the blend from specification. Following this, and allowing time for the immediately preceding change to be reflected in the new blend, the blending is again changed, if necessary, to partially correct for a deviation in the Reid vapor pressure from specification. Thenceforth, the cycle repeats, commencing with octane number. In this fashion, the system recognizes and compensates for the interdependence of the fuel quality variables cited, i.e., it recognizes that changes in blend composition to correct for a particular specification deviation will have a corresponding effect upon the other characteristics of the blend. By repetitious cycles the system reduces all specification deviations effectively to zero, and by making partial corrections in each cycle, wide fluctuations and "hunting" are avoided. It should be understood, however, that the particular series of cycles chosen is illustrative only.

In the description that follows, references are made to linear equations that can be used to compute properties of blends from properties of individual components. The scales and units of measurement used in analyses of component properties cannot always be used in linear blending computations unless some inaccuracy can be tolerated. The error will be greater for some quality computations than for others. The remedy for this problem is to transform readings of component properties into blending factors that can be used in linear blending equations of the type contained in the description following.

The process of linear transformation, based on either empirical or theoretically derived relationships, is a well-known technique in petroleum refining technology. The transformation functions are also easily built into sensing devices used to measure these properties so that a blending factor can be read directly from an instrument dial or can be converted into an electrical signal that is proportional to the blending factor. Therefore, references hereinafter to component or blend properties in terms of the conventional property dimensions are understood to mean the linear blending factors when required.

OCTANE NUMBER BLEND CONTROL

Figure 2:
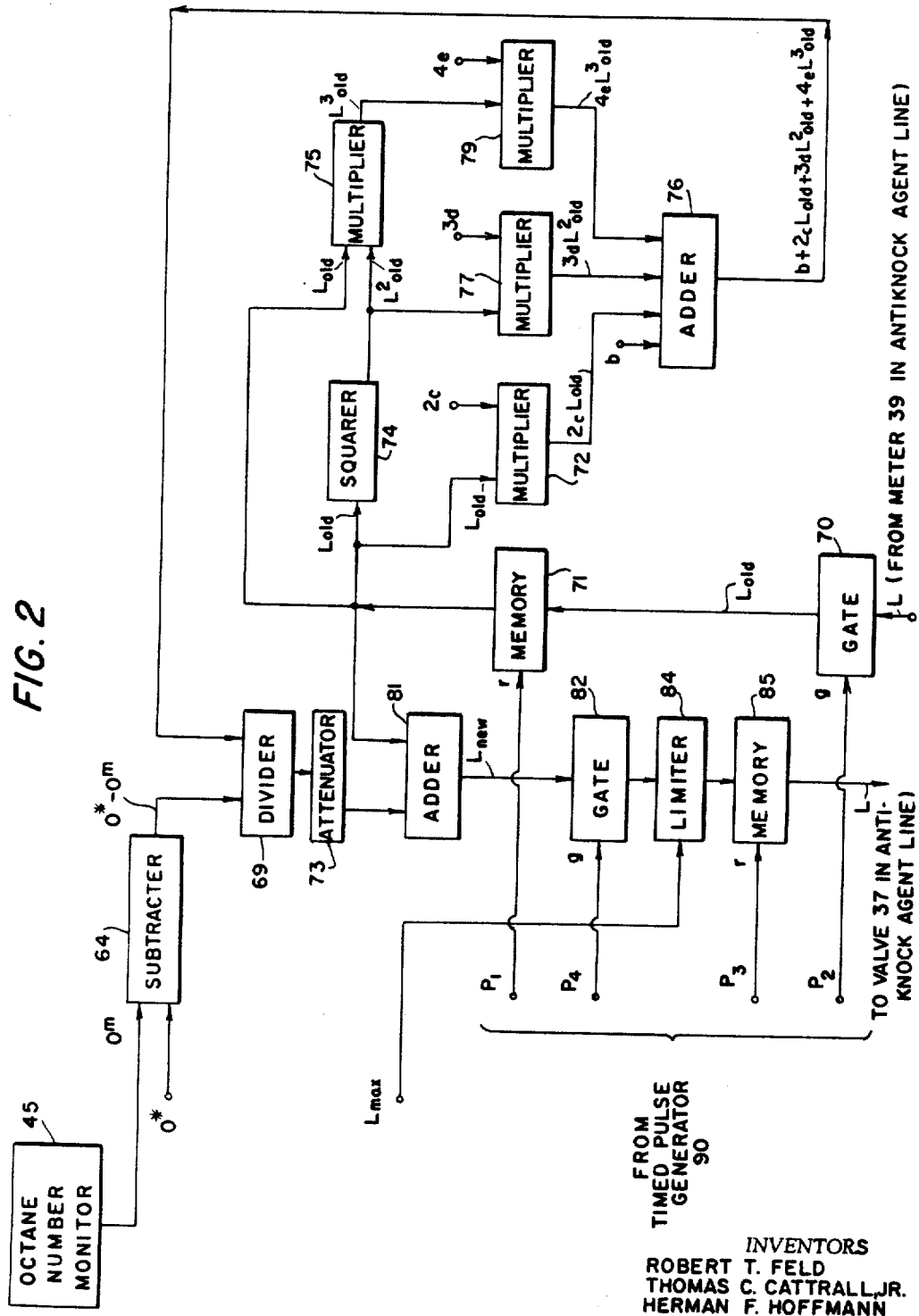
FIG. 2 is a block diagram of a portion of a fuel blending system in accordance with the invention that regulates the blending of the fuel in accordance with the octane number of the finished blend.

FIG. 2 shows in detail the portion of the system which regulates the blending process in accordance with octane number. Before considering the circuit itself, the general theoretical relationships regarding octane number and fuel components will be developed.

For any blending process, the octane number of a blended fuel may be expressed by the following relation:

$$O = O_a{}^o X_a + O_c{}^o X_c + O_r{}^o X_r + O_b{}^o X_b + a + bL + cL^2 + dL^3 + eL^4 \quad (1)$$

where $O$ is the octane number of the blended fuel; $O_a{}^o$, $O_c{}^o$, $O_r{}^o$, and $O_b{}^o$ are the octane numbers of the alkylate, light TCC gasoline, reformate, and butane components of the blend, respectively, with no anti-knock agent present; $X_a$, $X_c$, $X_r$, and $X_b$ are the volume fractions of the alkylate, light TCC gasoline, reformate, and butane components, respectively; $L$ is the amount of the anti-knock agent, typically expressed in cubic centimeters (cc.) per gallon; and $a$, $b$, $c$, $d$, and $e$ are predetermined constants.

As may be noted, Relation 1 assumes that the alkylate, light TCC gasoline, reformate, and butane components blend volumetrically, and that the effect of the anti-knock agent upon octane number may be expressed by a polynomial expansion with fixed coefficients. These assumptions are permissible within the context of the present system, since that system is one which is in continuous adjustment tending to reduce to zero deviations in quality from predetermined specifications. If any error is introduced by virtue of the assumptions, it will tend to have no effect as the system continuously adjusts itself to satisfy the specifications; the only effect is on the response characteristic and the manner in which a particular deviation is corrected.

If the volume fractions of alkylate, light TCC gasoline, reformate, and butane are assumed to remain constant and that only the amount of anti-knock agent is varied to change the octane number of a blended fuel, then Relation 1 can be differentiated to give the following relation which expresses the relationship between a change in anti-knock agent concentration and a corresponding change in octane number:

$$\frac{d}{dL}O = b + 2cL + 3dL^2 + 4eL^3 \quad (2)$$

where $$d/dL$$

is the differential operator.

As an approximation, then, the change in anti-knock agent concentration necessary to produce a given change in octane number of the blend fuel may be expressed by the following relation:

$$\Delta L = \frac{\Delta O}{b + 2cL + 3dL^2 + 4eL^3} \quad (3)$$

where $\Delta L$ is the change in anti-knock agent concentration and $\Delta O$ is the change in octane number.

Accordingly, if a blend is detected as being off-specification in octane number by an amount $\Delta O$, Relation 3 expresses the amount by which the anti-knock agent concentration must be changed to bring the blend to specification. Thus if $L_{old}$ designates the amount of anti-knock agent presently being added to the blend, and $L_{new}$ designates the new concentration that will be in effect after the concentration has been changed by the amount $\Delta L$, then:

$$L_{new} = L_{old} + \Delta L \quad (4)$$

Substituting the expressions for $\Delta L$ from Relation 3 in Relation 4:

$$L_{new} = L_{old} + \frac{\Delta O}{b + 2cL_{old} + 3dL_{old}^2 + 4eL_{old}^3} \quad (5)$$

Relation 5 may be rewritten as follows:

$$L_{new} = L_{old} + \frac{O^* - O^m}{b + 2cL_{old} + 3dL_{old}^2 + 4eL_{old}^3} \quad (6a)$$

where $O^*$ is the desired octane number of the blend, and $O^m$ is the measured or present octane number of the blend.

Thus, Relation 6a relates a new concentration of anti-knock agent needed to produce the desired octane number to the old or present concentration and the octane deviation from the desired level. It is desirable, however, to define a new concentration of anti-knock agent in terms of the amount needed to correct partially for a particular octane number deviation from specification. Relation 6a therefore may be rewritten as follows:

$$L_{new} = L_{old} + T_1 \left[ \frac{O^* - O^m}{b + 2cL_{old} + 3dL_{old}^2 + 4eL_{old}^3} \right] \quad (6b)$$

where $T_1$ is an attenuation factor between zero and 1, and $L_{new}$ is as defined above with the exception, however, that it does not reflect the concentration of anti-knock agent necessary to compleetely correct for a given deviation in octane number.

The apparatus of FIG. 2 carries out a series of calculations to instrument Relation 6b above. Specifically, signals from the octane number monitor 45, representing $O^m$ in relation 6b, i.e., the measured octane number, are applied as one input to a subtracter 64. Applied as the other input to the subtracter 64 is a signal $O^*$ which, as explained with reference to Relation 6b, is the octane number desired for the blend.

The signal representing $O^*$ is obtained from a reference signal generator 65 shown in FIG. 8A. Such a signal, which is normally fixed with regard to any particular blending process, may be obtained through the use of a simple circuit such as that shown in FIG. 8B. As shown in that figure, a battery 66 supplies a potential to a potentiometer 67 to provide an output signal representative of $O^*$ at an output terminal 68. $O^*$ is changed by varying the potentiometer.

Returning to FIG. 2, the output of the subtracter 64, which is equal to $O^* - O^m$, is representative of the deviation of the octane number of the blend from the desired value. This signal is applied as one input to a divider 69, the other input to which is a signal representative of the expression:

$$b + 2cL_{old} + 3dL_{old}^2 + 4eL_{old}^3 \quad (7)$$

The signal representative of Expression 7 is developed as follows.

The signal from the meter 39 in the anti-knock agent line may be taken to represent the quantity $L_{old}$ in Expression 7. Although $L_{old}$ has the dimensions of volume of anti-knock agent per volume of gasoline, it is not necessary to divide the signal from the meter 39 by a signal representative of volume flow of gasoline, since the volume flow of gasoline remains constant, as will be explained hereinafter, and may be assumed to be equal to unity for the purpose of the present computation.

The signal from the meter 39 is applied through a linear gate 70 to a memory 71 wherein it is stored. The signal from the memory 71 is applied to a multiplier 72, a squarer 74, and another multiplier 75. Also applied to the multiplier 72 is a signal from the reference signal generator 65 of FIG. 8A that represents the fixed quantity $2c$ in Expression 7. Thus the output of the multiplier 72 is representative of the quantity $2cL_{old}$, and this signal is applied as one input to an adder 76.

The signal from the squarer 74, which is representative of $L_{old}^2$, is applied to the multiplier 75 and to a multiplier 77. Also applied to the multiplier 77 is a signal from the reference signal generator 65 of FIG. 8A representative of the quantity $3d$. Accordingly, the signal from the multiplier 77 is representative of the quantity $3dL^2_{old}$, and this signal is applied to the adder 76.

The multiplier 75, having as its two input signals those signals representative of the quantities $L_{old}$ and $L^2_{old}$, thus produces an output signal representative of the quantity $L^3_{old}$, which is applied as one input to a multiplier 79. Also applied to the multiplier 79 is a signal from the reference signal generator 65 of FIG. 8A representative of the quantity $4e$. Thus the multiplier 79 produces an output signal representative of the quantity $4eL^3_{old}$, which is applied to the adder 76.

The final input to the adder 76 is a signal representative of the quantity $b$, which is derived from the reference signal generator 65 of FIG. 8A. Thus the signal from the adder 76, which is equal to the sum of its four input signals, is representative of Expression 7 above.

The signal from the divider 69, representative of the fractional component in Relation 6a, i.e., the computed change in anti-knock agent concentration needed to bring the blend to octane number specification, is applied to a signal attenuator 73, which may comprise, for example, a potentiometer. The signal from the attenuator 73 therefore, represents $T_1 \Delta L$ where $T_1$ is the attenuation factor from Relation 6b that limits the magnitude of the correction $\Delta L$ in Relation 4 above and provides positive protection against wide fluctuations about the specification. Typically, $T_1$ may be in the range ½ to ¾, although it may vary from a small fraction to 1.

The signal from the attenuator 73 is applied as one input to an adder 81. Applied as the other input to the adder is a signal from the memory 71, which is representative of the quantity $L_{old}$. Accordingly, the signal from the adder 81 is representative of $L_{new}$ in Relation 6b, i.e., the new concentration of anti-knock agent to be added to the blend on a per gallon basis, for example, to make all or part, depending upon the magnitude of the attenuation above, of the correction required to bring the octane number to specification. Successive cycles will thus effectively produce specification product. By spreading the correction needed over a number of cycles, the system is permitted to make other changes to correct for deviations in other parameters, and thereby accounts for the interdependence of the various specifications and also prevents wide fluctuations about the specifications.

The signal from the adder 81 is applied to a linear gate 82 and thence through a limiter 84 to a memory 85 wherein it is stored. The limiter may be a conventional clipper as shown in FIG. 11, for example, comprising a diode 86 connected as shown. A clipping level signal representing the maximum signal from the limiter is applied to a terminal 87, and when the input signal to the clipper, applied to terminal 88, exceeds this maximum magnitude, the diode 86 conducts, clamping the signal at output terminal 89 at this maximum magnitude.

Returning to FIG. 2, the limiter 84 has applied thereto a signal $L_{max}$ which is derived from the reference signal generator 65 of FIG. 8A and which represents the maximum anti-knock agent concentration which is permitted to be inserted into the blended fuel mixture. Normally, the maximum anti-knock agent concentration is 3 cc. of TEL, for example, per gallon of fuel. The TEL is thus a relatively non-bulk anti-knock agent. However, the maximum anti-knock agent concentration may reflect cost or supply data regarding the anti-knock agent itself, thereby to establish a limitation on its use based upon these factors. Thus, regardless of the magnitude of the signal $L_{new}$ generated by the adder 81, the signal applied to the memory 85 is limited so that it does not exceed $L_{max}$.

The signal from the memory 85 is applied to the valve 37 in the anti-knock agent line, and thus regulates the amount of anti-knock agent that is applied to the mixture.

A series of pulse signals from a timed pulse generator 90 shown in FIG. 9A is employed for gating purposes in the circuit of FIG. 2. Pulse leads $P_1$, $P_2$, $P_3$, and $P_4$ from the timed pulse generator 90 are the same as the like numbered leads in FIG. 2. Pulses appearing on these leads are shown in the pulse waveform diagram of FIG. 9B. As may be seen, the pulses $P_1$ through $P_4$ occur sequentially in time. A circuit for producing these pulses may take the form shown in FIG. 10.

As shown in FIG. 10, a timer 91 is supplied with a potential from a battery 92 which is coupled to a pair of relatively slowly revolving wipers 94 and 95 as well as to a relatively rapidly revolving wiper 96. As shown in the figure, the wipers 94, 95 and 96 are assumed to rotate clockwise, although counterclockwise rotation would also suffice. When the wiper 94 engages a contact 97, the potential from the battery 92 is applied to each one of four AND gates 99, 100, 101, and 102. The time during which the wiper 94 engages the contact 97 is chosen to be equivalent to the time taken for the wiper 96 to complete one revolution.

Thus, as the wiper 96 engages a first contact 104, the potential from the battery 92 is applied through this contact to the AND gate 99, thereby energizing the gate and producing the first pulse signal $P_1$ shown in FIG. 9B. When the wiper 96 engages a second contact 105 on the timer 91, the battery potential is applied from this contact to the AND gate 100, thereby producing the pulse $P_2$ following the pulse $P_1$. Similarly, when the wiper 96 strikes a third contact 106 on the timer 91, the AND gate 101 is energized, producing the pulse $P_3$. Finally, when the wiper 96 engages a fourth contact 107, the AND gate 102 is energized, producing the pulse $P_4$. In this fashion, the four successive pulses $P_1$ through $P_4$ are produced on the leads $P_1$ through $P_4$, respectively, which are used for gating purposes in the circuit of FIG. 2.

Returning to FIG. 2, the first pulse $P_1$ resets the memory 71 and clears it of any signal previously stored therein. The second pulse $P_2$ gates open the gate 70 so that the signal from the meter 39 in the anti-knock agent line may be gated to the memory 71 to be stored therein. This signal is representative of the present concentration of anti-knock agent currently being supplied to the blended mixture, as explained previously. Following this, the pulse $P_3$ resets the memory 85, thereby clearing it of the signal previously stored therein. Finally, the pulse $P_4$ gates open the gate 82, thereby supplying the signal from the adder 81, i.e., the signal $L_{new}$, through the limiter 84 and into the memory 85 wherein it is stored. Thus the memory 85 now contains a signal which is representative of the new concentration of anti-knock agent needed to be supplied to the blended fuel to bring it partially or entirely to octane specification, depending upon the attenuation of attenuator 73, and the signal from this memory is accordingly applied to control the solenoid operated valve 37 in the anti-knock agent line in a conventional manner.

In this regard, it should be noted that although the octane number monitor 45 continuously monitors the octane number of the finished blend of fuel, the signal therefrom is only effectively employed for the computation of Relation 6b when the pulse $P_4$ occurs.

The sequence of operations, i.e., the sequence of pulses $P_1$ through $P_4$, may be repeated as frequently as desired. The time that elapses between one set of pulses $P_1$ through $P_4$ and the following set should be sufficient to permit the changed concentration of anti-knock agent effected after the first set of pulses to be established at least by the time that the following set of pulses occurs. This time is dependent upon the flow rate in the blending line 29 of FIG. 1.

Initially during the first operation of the system, the valve 37 in the anti-knock agent line is established at a predetermined setting to provide a predetermined amount of anti-knock agent to the blended fuel in accordance with a predetermined formula. Following this, the system of FIG. 2 is energized and automatic monitoring and control according to octane number is effected.

VAPOR/LIQUID RATIO CONTROL

The blending of the fuel in accordance with vapor/liquid ratio is effected by the system shown in FIGS. 3 through 6. Before the control apparatus is described, however, a set of expressions will be developed defining the relationships between components in terms of their vapor/liquid ratios.

For a fuel blended from the components given in FIG. 1, the following relation expresses the contributions of the individual components of the blend to the vapor/liquid ratio of the finished blend of fuel.

$$V/L = \frac{(V/L)_a X_a + (V/L)_c X_c + (V/L)_r X_r + (V/L)_b X_b}{X_a + X_c + X_r + X_b} \quad (8)$$

where V/L is the vapor/liquid blending factor of the finished blend; $(V/L)_a$, $(V/L)_c$, $(V/L)_r$, and $(V/L)_b$ are the vapor/liquid blending factors of the alkylate, light TCC gasoline, reformate, and butane components, respectively; and $X_a$, $X_c$, $X_r$, and $X_b$ are the volume fractions of the alkylate, light TCC gasoline, reformate, and butane components, respectively.

Any minor error associated with Relation 8 is acceptable since the system is in continuous adjustment tending to reduce to zero any deviations from specification. Further, since the volume fraction of the anti-knock agent is negligible with respect to the other (relatively bulk) fuel components of the blend, the presence of the anti-knock agent has no effect upon the vapor/liquid ratio of the blend, and, therefore, the anti-knock agent is omitted as a factor in Relation 8 and the following relations. Accordingly, the following relation expresses the volumetric relationship between the alkylate, light TCC gasoline, reformate, and butane components:

$$X_c + X_a + X_r + X_b = 1 \quad (9)$$

The development of a generalized relation may be simplified, if the following volumetric average is computed:

$$(V/L)_{avg.\,a,\,r,\,b} = \frac{(V/L)_a X_a + (V/L)_r X_r + (V/L)_b X_b}{X_a + X_r + X_b} \quad (10)$$

where $(V/L)_{avg.\,a,\,r,\,b}$ represents a volumetric average for the alkylate, reformate, and butane components of the mixture.

Relations 8, 9, and 10 lead to the following relation:

$$V/L = (V/L)_c X_c + (V/L)_{avg.\,a,\,r,\,b}(X_a + X_r + X_b) \quad (11)$$

which may be simplified by solving Relation 9 for $X_a + X_r + X_b$ and substituting this in Relation 11.

$$V/L = (V/L)_c X_c + (V/L)_{avg.\,a,\,r,\,b}(1 - X_c) \quad (12)$$

Solving for $X_c$ in Relation 12 results in the following relation:

$$X_c = \frac{V/L - (V/L)_{avg.\,a,\,r,\,b}}{(V/L)_c - (V/L)_{avg.\,a,\,r,\,b}} \quad (13)$$

Relation 13 may be used to define the volume fraction of light TCC gasoline for an ideal or desired mixture. In this case, Relation 13 is written as follows:

$$X_c^* = \frac{(V/L)^* - (V/L)^*_{avg.\,a,\,r,\,b}}{(V/L)_c^* - (V/L)^*_{avg.\,a,\,r,\,b}} \quad (14)$$

where all the factors in the relation are as defined above, with the asterisk denoting the magnitude of the factor for an ideal or desired mixture.

Relation 13 also may be used to define the volume fraction of light TCC gasoline for a mixture as actually blended. In this case, Relation 13 is written as follows:

$$X_c^m = \frac{(V/L)^m - (V/L)^m_{avg.\,a,\,r,\,b}}{(V/L)_c^m - (V/L)^m_{avg.\,a,\,r,\,b}} \quad (15)$$

where the factors in the relation are as defined above, with the "m" prime denoting the actual magnitude of the factor as measured.

If it is assumed that $(V/L)^m_{avg.\,a,\,r,\,b}$ is equal to $(V/L)^*_{avg.\,a,\,r,\,b}$ and that $(V/L)_c^m$ equals $(V/L_c^*)$, which is proper since the volume fraction averages and the vapor/liquid ratio of the light TCC gasoline component do not change greatly in any practical blending process, then relation 14 minus Relation 15 results in the following relation:

$$X_c^* - X_c^m = \frac{(V/L)^* - (V/L)^m}{(V/L)_c^* - (V/L)^*_{avg.\,a,\,r,\,b}} \quad (16)$$

The assumptions are also permissible in the present system, since they only affect the degree of any correction that is made in response to a particular specification deviation. Because the system is in continual adjustment, all deviations are eventually reduced to zero.

Since Relation 16 expresses a change in volume fraction of the light TCC gasoline component in terms of the difference between a desired vapor/liquid ratio for the blend and an actual or measured vapor/liquid ratio, it represents the amount by which the volume fraction of the light TCC gasoline component must change to correct the vapor/liquid ratio of the blend so that it conforms to that desired. Accordingly, the following relation may be developed to express a new volume fraction for the light TCC gasoline component when a change in volume fraction as given by Relation 16 is made to produce a desired vapor/liquid ratio:

$$(X_c)_{new} = (X_c)_{old} + \frac{(V/L)^* - (V/L)^m}{(V/L)_c^* - (V/L)^*_{avg.\,a,\,r,\,b}} \quad (17a)$$

where $(X_c)_{new}$ represents the new volume fraction of the light TCC gasoline component and $(X_c)_{old}$ represents the previous volume fraction of the light TCC gasoline component at the time of measurement.

It is desirable, however, to define a new volume fraction for the light TCC gasoline component in terms of the amount needed to correct only partially for a particular vapor/liquid ratio deviation from specification. Relation 17a, therefore, may be rewritten as follows:

$$(X_c)_{new} = (X_c)_{old} + T_2\left[\frac{(V/L)^* - (V/L)^m}{(V/L)_c^* - (V/L)^*_{avg.\,a,\,r,\,b}}\right] \quad (17b)$$

where $T_2$ is an attenuation factor between zero and 1, and $(X_c)_{new}$ is as defined above with the exception, however, that it does not reflect the fraction of light TCC gasoline component needed in the blend to correct completely for a given deviation in vapor/liquid ratio.

Thus, Relation 17b relates a new fraction of light TCC gasoline to the old or present fraction plus the vapor/liquid ratio deviation from specification.

Since the volume flow of the entire fuel blend should remain constant, i.e., since Relation 9 should be satisfied at all times, any volume fraction change in any one of the four basic components must be compensated for by a volume fraction change in at least one of the remaining three components. In this regard, if each of the remaining three components is changed so that its volume fraction bears the same proportion to the two other remaining components after the change as before the change, then the following relation expresses the new volume fraction, for example, for the alkylate component:

$$(X_a)_{new} = \frac{(X_a)_{old}}{(X_a + X_r + X_b)_{old}}(X_a + X_r + X_b)_{new} \quad (18)$$

where the factors in the relation are as defined above, with the subscripts "new" and "old" denoting the magnitudes of the factors after and before a change, respectively.

Relation 18 may be rewritten as follows, utilizing the relationship given in Relation 9:

$$(X_a)_{new} = \frac{(X_a)_{old}}{(X_a + X_r + X_b)_{old}}(1 - X_c)_{new} \quad (19)$$

Similarly, the new volume fractions for the reformate and butane components, respectively, may be expressed as follows:

$$(X_r)_{new} = \frac{(X_r)_{old}}{(X_a + X_r + X_b)_{old}}(1 - X_c)_{new} \quad (20)$$

$$(X_b)_{new} = \frac{(X_b)_{old}}{(X_a + X_r + X_b)_{old}}(1 - X_c)_{new} \quad (21)$$

As may be noted, then, Relations 19, 20, and 21 relate the new volume fractions of the alkylate, reformate, and butane components of the blend, respectively, to the volume fractions existing at any particular time in the blending process and the new volume fraction established for the light TCC gasoline component. These relations, as well as Relation 17b are instrumented by the system shown in FIGS. 3 through 6.

The portion of the system of FIGS. 3 through 6 that instruments Relations 17b, 19, 20, and 21 uses pulse gating techniques similar to those employed in the system of FIG. 2. Thus, five pulses, $P_5$, $P_6$, $P_7$, $P_8$, and $P_9$ from the timed pulse generator 90 of FIG. 9A, as shown in time in FIG. 9B, are used for gating purposes in controlling the vapor/liquid ratio. The pulse numbered leads from the timed pulse generator 90 correspond to the same numbered leads in FIGS. 3 and 4.

As with the system of FIG. 2, the timer shown in FIG. 10 may be used to generate the pulses $P_5$ through $P_9$. Thus, referring to that figure, when the relatively slowly revolving wiper 94 engages a contact 110, the potential of the battery 92 is applied through the contact to a series of AND gates 111, 112, 114, and 115. During this time, the relatively rapidly revolving wiper 96 engages in succession the contacts 104, 105, 106 and 107, thereby sequentially enabling the AND gates 111, 112, 114 and 115. The signal from the AND gate 111 is applied through an OR gate 116 to produce the first pulse $P_5$. The sequential signals from the AND gates 112 and 114 produce the pulse signals $P_6$ and $P_7$, respectively. The signal from the AND gate 115 passes through an OR gate 117 to produce the pulse $P_8$. After the relatively rapidly rotating wiper 96 has passed the contact 107 and the wiper 94 passes out of engagement with the contact 110, i.e., after pulse $P_8$, the wiper 95, which rotates with the wiper 94, engages an arcuate contact 118. Thus, the potential of the battery 92 is supplied through the contact 118 to produce the pulse $P_9$ of relatively long duration.

Figure 3:
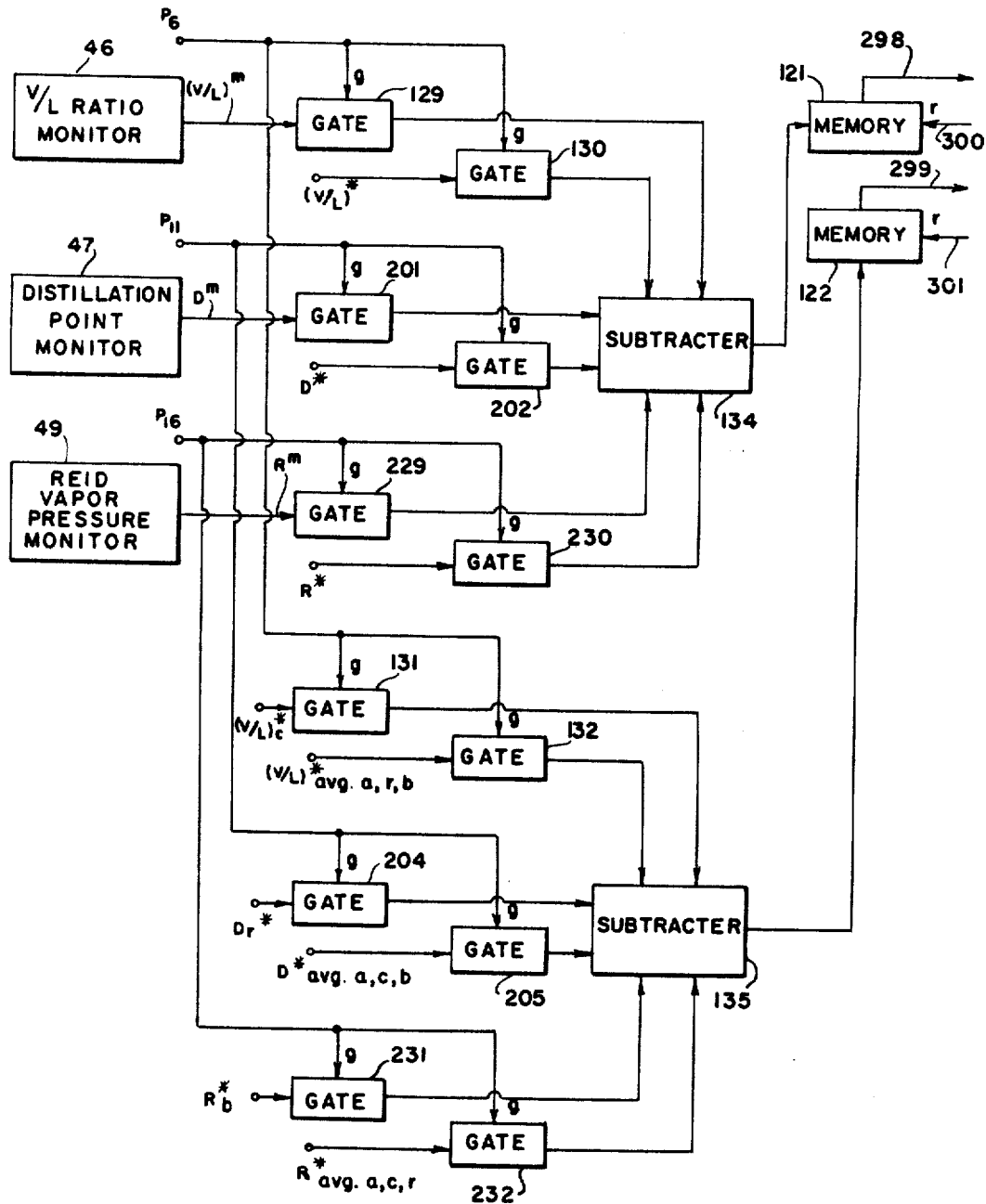
Figure 4:
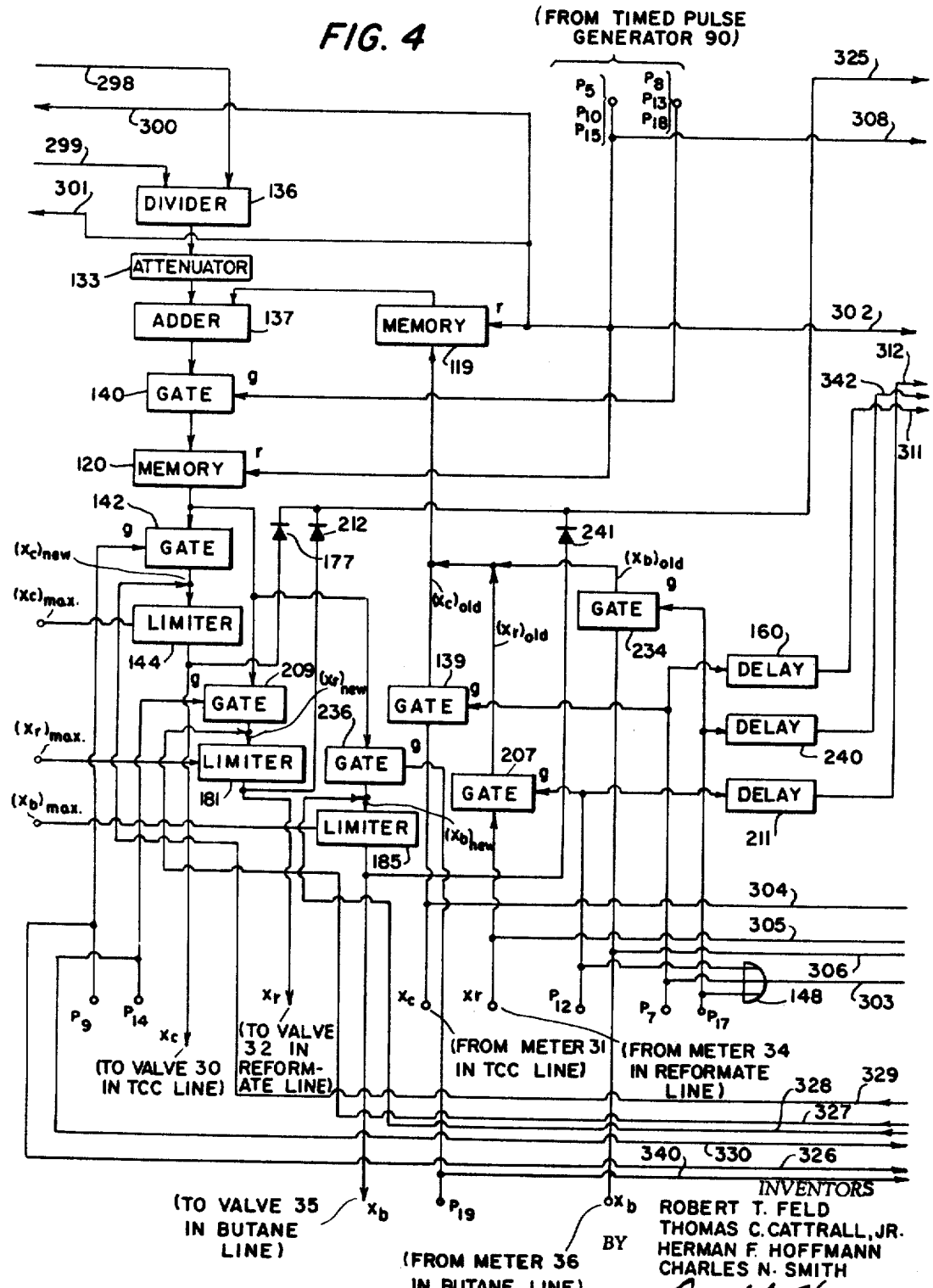
Figure 5:
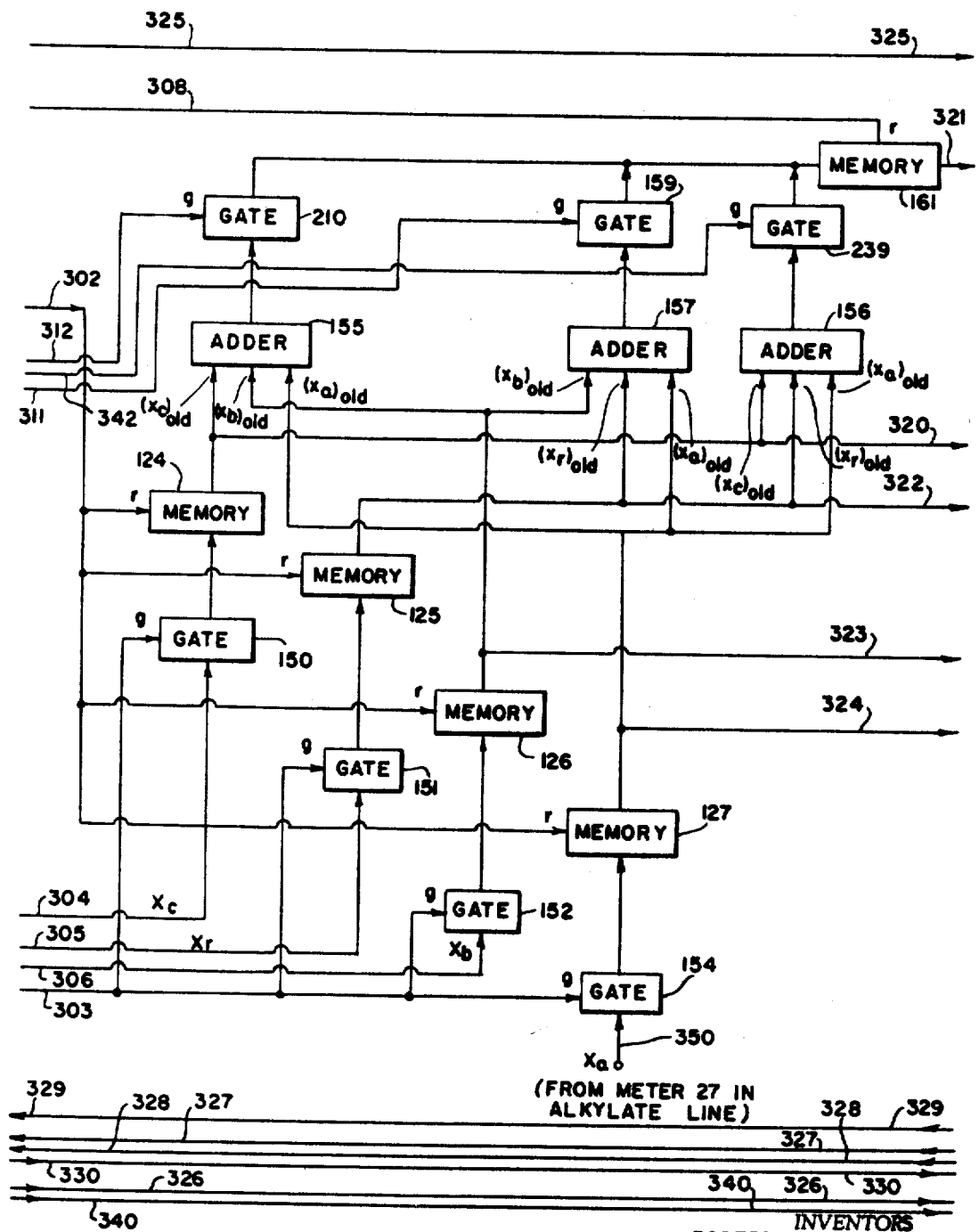

Referring to FIG. 4, the pulse $P_6$ (top of figure) resets memories 119 and 120, as well as memories 121 and 122 of FIG. 3 through leads 300 and 301, respectively, memories 124, 125, 126, and 127 of FIG. 5, through lead 302, and memory 161 of FIG. 5 through lead 308, thereby to clear the memories of any signals previously stored therein.

The pulse $P_6$ (FIG. 3) serves to gate open simultaneously linear gates 129, 130, 131 and 132. The gating open of the gate 129 by the pulse $P_6$ passes a signal from the vapor/liquid ratio monitor 46, representing the quantity $(V/L)^m$ in Relation 17b, to a subtracter 134. The gating open of the gate 130 passes a signal from the reference signal generator 65 of FIG. 8A, representative of the factor $(V/L)^*$ in Relation 17b, to the subtracter 134. Accordingly, the output signal from the subtracter 134 is representative of the numerator of the fractional component of Relation 17b, i.e., the difference between the vapor/liquid ratio desired for the blended fuel and the ratio actually existing as measured by the vapor/liquid ratio monitor 46. This signal is stored in the memory 121.

In this regard, although the vapor/liquid ratio monitor 46 continuously monitors the vapor/liquid ratio of the finished blend of fuel, the signal therefrom is only gated through the gate 129 for a relatively short period of time when the pulse $P_6$ occurs.

When the gate 131 is gated open by the pulse signal $P_6$, a signal from the reference signal generator 65 of FIG. 8A, representative of the factor $(V/L)_c^*$ in Relation 17b, i.e., the vapor/liquid ratio of the light TCC gasoline component, is gated through the gate and applied to a subtracter 135. Similarly, when the gate 132 is gated open, a signal from the reference signal generator 65 representing the factor $(V/L)^*_{avg.\ a,r,b}$ of Relation 17b is also applied to the subtracter 135. The output signal from the subtracter, therefore, is representative of the denominator of the fractional component of Relation 17b, and this signal is applied to the memory 122, wherein it is stored.

The signals from the memories 121 and 122 are applied through respective leads 298 and 299 to a divider 136 (FIG. 4), the output signal of which represents the fractional component of Relation 17a. The output signal from the divider 136 is applied to an attenuator 133, which may comprise, for example, a potentiometer that modifies the signal by the factor $T_2$ in Relation 17b. The signal from the attenuator 133 thus is representative of the quantity in the right-most portion of Relation 17b, and because of the attenuation, positive protection is provided against wide fluctuations about the specification. Typically, $T_2$ may be in the range ½ to ¾, although it may vary from a small fraction to 1.

The signal from the attenuator 133 is applied to an adder 137, to which is also applied a signal from the memory 119 representative of the factor $(X_c)_{old}$ in Relation 17b. The signal representative of this factor is developed as follows.

The pulse signal $P_7$ (lower portion of FIG. 4) is applied as a gating signal to gate open a linear gate 139. When gated open, the gate 139 passes a signal from the meter 31 in the light TCC gasoline line. Since the meter signal represents the present flow of light TCC gasoline to the blending line 29 of FIG. 1, the signal gated through the gate 139 is representative of the factor $(X_c)_{old}$ of Relation 17b. Although $(X_c)_{old}$ is a volume fraction, it is not necessary to divide the signal from the meter 31 by a signal representative of the total volume flow of gasoline, since the volume flow of gasoline remains constant, and is equal to unity, as expressed by Relation 9. The signal from the meter 31 is applied to the recently reset memory 119 and is stored therein and applied to the adder 137.

The signal from the adder 137, accordingly, is representative of the right hand-side of Relation 17b, i.e., the new fraction of light TCC gasoline to be established in the blend to make all or part, depending upon the magnitude of the attenuation above, of the correction required to bring the vapor/liquid ratio to specification. Successive cycles will thus effectively produce specification product. By spreading the correction needed over a number of cycles, the system is permitted to make other changes to correct for deviations in other parameters, and thereby accounts for the interdependency of the various specifications and also prevents wide fluctuations about the specifications.

The signal from the adder 137 is applied to a linear gate 140 which is gated open by the pulse $P_8$ to transmit the signal from the adder 137 therethrough to the memory 120 for storage therein. The signal from the memory 120 is applied to a linear gate 142, which is gated open by the pulse $P_9$, to apply the signal from the memory to a limiter 144. The limiter 144 has applied thereto a signal from the reference signal generator 65 of FIG. 8A representative of the quantity $(X_c)_{max}$ and limits the magnitude of the signal from the memory 120 that passes therethrough so that it does not exceed this maximum magnitude. This represents the maximum amount of light TCC gasoline that can be added to the blending line 29 of FIG. 1, and may reflect cost or supply data regarding the light TCC gasoline component itself, for example.

The signal from the limiter 144, representative of the new amount of light TCC gasoline that is to be used for blending, is applied to the valve 30 in the light TCC gasoline line, thereby establishing the flow of that component to the blending line 29. This signal is applied to the valve 30 as long as the gate 142 is gated open by the pulse signal $P_9$. The valve 30 is a relatively slow acting valve and maintains the control setting established at the end of the pulse signal $P_9$ for a period of time sufficient to maintain control until the next control sequence is initiated. As may be seen from the pulse waveform diagram of FIG. 9B, the pulse $P_9$ is generated until the next series of pulses $P_{10}$, $P_{11}$, $P_{12}$, $P_{13}$, and $P_{14}$ occurs. These latter five pulses are used for gating purposes during the control of the blending in accordance with the distillation point of the finished blend. In this regard, although the pulse cycles $P_5$ through $P_9$ and $P_{10}$ through $P_{14}$ have been related to each other, they need not be so related, and each series may proceed independently of the other on its own cycle, with regard only to flow velocity of the blend, so that a change will not be computed for the blend until the previous change has been made and is reflected in the product monitored.

As pointed out with regard to Relations 19, 20, and 21, the amounts of alkylate, reformate, and butane components that are blended together must be changed concurrently with the change in the light TCC gasoline component. These changes are effected simultaneously with the changing of the light TCC gasoline component, as follows.

The pulse $P_7$ (lower portion of FIG. 4) is applied to an OR gate 148 to gate open each one of a series of linear gates 150, 151, 152, and 154 (FIG. 5) through a lead 303. The gate 150 has applied thereto a signal from the meter 31 in the light TCC gasoline line through a lead 304, which is stored in the recently reset memory 124. Similarly, the gate 151 has applied thereto a signal from the meter 34 in the reformate line through a lead 305, which is applied through the gate to the memory 125 and stored therein. The gate 152 passes a signal from the meter 36 in the butane line through a lead 306 to the memory 126, while the gate 154 passes a signal via lead 350 from the meter 27 in the alkylate line to the memory 127.

The signal from the memory 124 is applied to an adder 155, as well as to another adder 156. The signal from the memory 125 is applied to the adder 156, as well as to another adder 157. The signal from the memory 126 is applied to the adders 155 and 157, while the signal from the memory 127 is applied to the adders 155 and 156.

As may be noted, the output signal from the adder 157 is representative of the quantity expressed in each of the denominators of the fractional components of Relations 19, 20, and 21. This signal is applied to a linear gate 159, which is gated open by the pulse signal $P_7$ after a short delay effected by a delay unit 160 (FIG. 4) in a lead 311. The signal from the gate 159 is stored in a memory 161, the output of which is applied through a lead 321 to a series of dividers 162, 164, 165, and 166 (FIG. 6).

The divider 164 has applied thereto through a lead 322 the signal $(X_r)_{old}$ from the memory 125, and the output signal from the divider is representative of the fractional component of Relation 20. Similarly, the divider 165 has applied thereto through a lead 323 the signal $(X_b)_{old}$ from the memory 126, and the output signal from the divider is representative of the fractional component of Relation 21. Likewise, the divider 166 has applied thereto through a lead 324 the signal $(X_a)_{old}$ from the memory 127, and the output signal from the divider is representative of the fractional component of Relation 19. In this particular control sequence, the signal from the divider 162 represents meaningless information and is not used in the present computations, as will be made apparent hereinafter.

The output signals from the dividers 162, 164, 165, and 166 are applied to a series of multipliers 170, 171, 172, and 174, respectively. Also applied to the multipliers 170 through 174 is a signal from a subtracter 175 which is representative of the quantity $(1-X_c)_{new}$ in Relations 19, 20, and 21. The signal is generated as follows.

The signal from the limiter 144 of FIG. 4, i.e., the signal applied to the valve 30 in the light TCC gasoline line and which is representative of $(X_c)_{new}$, limited so that it does not exceed $(X_c)_{max}$, is applied through a diode 177 and a lead 325 to the subtracter 175. Also applied to the subtracter is a unity signal from the reference signal generator 65 of FIG. 8A. Accordingly, the output signal from the subtracter 175 is representative of the quantity $(1-X_c)_{new}$ in Relations 19, 20, and 21.

The signal from the multiplier 171 of FIG. 6 is representative of the right-hand side of relation 20, i.e., the quantity $(X_r)_{new}$. This signal is applied through a linear gate 179 which is gated by the pulse signal $P_9$ passing through a lead 326 and a diode 180. The signal from the gate 179 is applied through a lead 327 to a limiter 181 (FIG. 4), the output signal from which is applied to the valve 32 in the reformate line to control the amount of reformate that is applied to the blending line 29. The limiter has applied thereto a signal $(X_r)_{max}$ from the reference signal generator 65 of FIG. 8A, which controls the maximum magnitude of the signal from the limiter in accordance with cost and supply data, for example, regarding the reformate component. In this fashion, an independent constraint is placed on the amount of reformate supplied to the blend.

Similarly, the output signal from the multiplier 172 is representative of the right-hand side of Relation 21, i.e., the quantity $(X_b)_{new}$. This signal is applied to a linear gate 182 which is also gated open by the pulse signal $P_9$ through the lead 326 and a diode 184. The signal from the gate 182 is applied through a lead 328 to a limiter 185 (FIG. 4), the output signal from which is applied to the valve 35 in the butane line to control the addition of butane in the blend. The limiter 185 has applied thereto a signal $(X_b)_{max}$ from the reference signal generator 65 of FIG. 8A, which limits the maximum magnitude of the signal from the limiter to this value. This constraint may depend upon any one or more of a number of factors affecting the use of the butane component.

Finally, the signal from the multiplier 174, which is representative of the right-hand side of Relation 19, i.e., the quantity $(X_a)_{new}$, is applied to a linear gate 186 that is gated open by the pulse signal $P_9$ through the lead 326 and a diode 187. The signal from the gate 186 is applied through a limiter 189 to the valve in the alkylate line to control the addition of that component to the blend of fuel. The limiter 189 has applied thereto a signal $(X_a)_{max}$ from the reference signal generator 65 of FIG. 8A, which prevents the signal from the limiter from exceeding this maximum value and which may be set according to any predetermined constraint.

It should be noted that although the multiplier 170 produces an output signal, representative of meaningless information in the present computation, this signal is blocked by an associated gate 190 whose gating input is not energized.

Thus, the circuit of FIGS. 3 through 6, when gated by the pulses $P_5$ through $P_9$, controls the blending process in accordance with the vapor/liquid ratio of the finished blend of fuel, as well as in accordance with other constraints pertinent to the blending process.

DISTILLATION POINT CONTROL

The expressions defining the relationships between fuel components in terms of a predetermined distillation point for each component are developed in a fashion similar to that in which Relations 8 through 21 were developed to define the relationships between components in terms of their vapor/liquid ratios. Specifically, it is assumed that the components blend volumetrically regarding distillation point and that the actual non-linear blending relationships may be expressed by linear approximations. Further, it is assumed that Relation 9 is still controlling and that the presence of the anti-knock agent has no effect upon the distillation point of the blend.

Accordingly, for a fuel blended from the components given in FIG. 1, the following relation expresses the distillation point of the blended fuel in terms of the distillation points of the individual components of the blend:

$$D = \frac{D_a X_a + D_c X_c + D_r X_r + D_b X_b}{X_a + X_c + X_r + X_b} \quad (22)$$

where D is the distillation point of the finished blend; $D_a$, $D_c$, $D_r$, and $D_b$ are the distillation points of the alkylate, light TCC gasoline, reformate, and butane components, respectively; and $X_a$, $X_c$, $X_r$, and $X_b$ are the volume fractions of the alkylate, light TCC gasoline, reformate, and butane components, respectively.

In a fashion similar to that in which Relation 10 was developed, the following volumetric average may be computed:

$$D_{\text{avg. a,c,b}} = \frac{D_a X_a + D_c X_c + D_b X_b}{X_a + X_c + X_b} \quad (23)$$

where $D_{\text{avg. a, c, b}}$ represents a volumetric average for the alkylate, light TCC gasoline, and butane components of the mixture.

Manipulating Relations 22 and 23 in generally the same fashion as Relations 8, 9 and 10 above were manipulated in Relations 11 through 16, the following relation may be developed from Relations 22 and 23:

$$X_r^* - X_r^m = \frac{D^* - D^m}{D_r^* - D^*_{\text{avg. a,c,b}}} \quad (24)$$

where the factors in the relation are as defined above, with the asterisk denoting the magnitude of the factor for an ideal or desired mixture and the "m" prime denoting the actual magnitude of the factor as measured.

Relation 24, therefore, expresses a change in volume fraction of the reformate component in terms of the difference between a desired distillation point for the blend and an actual or measured distillation point. Accordingly, the change in volume fraction of the reformate component in Relation 24 represents the amount by which the volume fraction of that component must change to correct the distillation point of the blend so that it conforms to that desired. Thus the following relation may be developed to express a new volume fraction for the reformate component when a change in volume fraction as given by Relation 24 is made to produce a desired distillation point for the blend:

$$(X_r)_{\text{new}} = (X_r)_{\text{old}} + \frac{D^* - D^m}{D_r^* - D^*_{\text{avg. a,c,b}}} \quad (25a)$$

where $(X_r)_{\text{new}}$ represents the new volume fraction of the reformate component and $(X_r)_{\text{old}}$ represents the previous volume fraction of the reformate component at the time of measurement.

It is desirable, however, to define a new volume fraction for the reformate component in terms of the amount needed to correct only partially for a particular distillation point deviation from specification. Relation 25a, therefore, may be rewritten as follows:

$$(X_r)_{\text{new}} = (X_r)_{\text{old}} + T_3 \left[ \frac{D^* - D^m}{D_r^* - D^*_{\text{avg. a,c,b}}} \right] \quad (25b)$$

where $T_3$ is an attenuation factor between zero and 1, and $(X_r)_{\text{new}}$ is as defined above with the exception, however, that it does not reflect the fraction of reformate component needed in the blend to correct completely for a given deviation in distillation point.

Thus, relation 25b relates a new fraction of reformate to the old or present fraction plus the distillation point deviation from specification.

To retain the volume flow of the entire fuel blend constant, i.e., to satisfy Relation 9, the following relations 26, 27 and 28 define the new volume fractions of the alkylate, light TCC gasoline, and butane components, respectively. In this regard, these three relations are similar to Relations 19 through 21, and ensure that each of the three components is changed so that its volume fraction bears the same proportion to the two other remaining components after the change as before the change.

$$(X_a)_{\text{new}} = \frac{(X_a)_{\text{old}}}{(X_a + X_c + X_b)_{\text{old}}} (1 - X_r)_{\text{new}} \quad (26)$$

$$(X_c)_{\text{new}} = \frac{(X_c)_{\text{old}}}{(X_a + X_c + X_b)_{\text{old}}} (1 - X_r)_{\text{new}} \quad (27)$$

$$(X_b)_{\text{new}} = \frac{(X_b)_{\text{old}}}{(X_a + X_c + X_b)_{\text{old}}} (1 - X_r)_{\text{new}} \quad (28)$$

where the factors in the relations are as defined above, with the subscripts "new" and "old" denoting the magnitudes of the factors after and before a change, respectively.

As may be noted, then, Relations 26, 27, and 28 relate the new volume fractions of the alkylate, light TCC gasoline, and butane components of the blend, respectively, to the volume fractions existing at any particular time in the blending process and the new volume fraction established for the reformate component. These relations, as well as Relation 25b, are instrumented by the system shown in FIGS. 3 through 6.

The portion of the system of FIGS. 3 through 6 that instruments Relations 25b, 26, 27 and 28 uses pulse gating techniques similar to those employed in the octane number and vapor/liquid ratio control systems previously described. Thus five pulses, $P_{10}$, $P_{11}$, $P_{12}$, $P_{13}$ and $P_{14}$ from the timed pulse generator 90 of FIG. 9A, as shown in time in FIG. 9B, are used for gating purposes in the distillation point control.

The timer of FIG. 10 may be used to generate the pulses $P_{10}$ through $P_{14}$. When the relatively slowly revolving wiper 94 engages a contact 192, the potential of the battery 92 is applied through the contact to a series of AND gates 194, 195, 196 and 197. When the relatively rapidly revolving wiper 96 engages in succession the contacts 104, 105, 106 and 107, the AND gates 194, 195, 196 and 197 are sequentially enabled, thereby producing the pulses $P_{10}$, $P_{11}$, $P_{12}$, and $P_{13}$. After the pulse $P_{13}$ is generated, the relatively slowly revolving wiper 95, which moves with the wiper 94, engages an arcuate contact 199, thereby to produce the pulse $P_{14}$ of relatively long duration.

Referring to FIG. 4, the pulse $P_{10}$ (top of figure) resets memories 119 and 120, as well as memories 121 and 122 of FIG. 3 through the leads 300 and 301, memories 124, 125, 126 and 127 of FIG. 5 through the lead 302, and memory 161 of FIG. 5 through the lead 308, thereby to clear the memories of any signals previously stored therein.

The pulse $P_{11}$ (FIG. 3) simultaneously gates open linear gates 201, 202, 204 and 205. The gate 201 passes a signal from the distillation point monitor 47 that is representative of the quantity $D^m$ in Relation 25b and applies the signal to the subtracter 134. The gate 202 passes a signal to the subtracter 134 from the reference signal generator 65 of FIG. 8A that is representative of the quantity $D^*$ in Relation 25b. Thus the output signal from the subtracter 134 is representative of the numerator of the fractional component of Relation 25b, i.e., the difference between the distillation point desired for the blended fuel and the distillation point actually existing as measured by the distillation point monitor 47. This signal is stored within the memory 121.

The gate 204 passes a signal to the subtracter 135 from the reference signal generator 65 of FIG. 8A that is representative of the quantity $D_r^*$ in Relation 25b.

Similarly, the gate 205 passes a signal representative of the quantity $D^*_{avg.\ a,c,b}$ in Relation 25b from the reference signal generator 65 to the subtracter 135. The output signal from the subtracter 135 thus is representative of the denominator of the fractional component of Relation 25b, and this signal is applied to the memory 122 wherein it is stored.

The signals from the memories 121 and 122 are applied through the leads 298 and 299, respectively, to the divider 136 (FIG. 4), the output signal of which, accordingly, represents the fractional component of Relation 25a. The output signal from the divider 136 is applied to the attenuator 133 which modifies the signal by the factor $T_3$ in Relation 25b. In this case, $T_3$ is equal to $T_2$ of Relation 17b since the attenuator 133 is used for the computations involving both the vapor/liquid ratio and the distillation point. The signal from the attenuator 133 thus is representative of the quantity in the right-most portion of Relation 25b, and because of the attenuation, positive protection is provided against wide fluctuations about the specification.

The output signal from the attenuator 133 is applied to the adder 137 to which is also applied a signal from the memory 119 representative of the factor $(X_r)_{old}$ in Relation 25b. This latter signal is developed as follows.

The pulse signal $P_{12}$ (lower portion FIG. 4) is applied as a gating signal to gate open a linear gate 207. When gated open, the gate 207 passes a signal from the meter 34 in the reformate line representative of the present flow of reformate to the blending line 29 of FIG. 1. This signal is applied to the recently reset memory 119 and is stored therein and applied to the adder 137. In this regard, although the extinguishment of the pulse $P_9$ prior to the pulses $P_{10}$ through $P_{14}$ leaves the component control valves 26, 30, 32, 35, and 37 (FIG. 1) without control signals, the pulses $P_{10}$ through $P_{14}$ occur so rapidly thereafter that the valves remain open at substantially their last control settings, as explained with reference to valve 30, and the meters 27, 31, 34, 36, and 39 register the previous component flows when the pulse $P_{12}$ occurs.

The signal from the adder 137 is representative of the right-hand side of Relation 25b, i.e., the new fraction of reformate necessary to be established in the blend to make all or part, depending upon the magnitude of the attenuation above, of the correction required to bring the distillation point to specification. Successive cycles will thus effectively produce specification product. By spreading the correction needed over a number of cycles, the system is permitted to make other changes to correct for deviations in other parameters, and thereby accounts for the interdependency of the various specifications and also prevents wide fluctuations about the specifications.

A signal from the adder 137 is applied to the linear gate 140 which is gated open by the pulse $P_{13}$ to transmit the signal from the adder to the memory 120 for storage therein. The signal from the memory 120 is applied to a linear gate 209, which is gated upon by the pulse $P_{14}$, to apply the signal from the memory to the limiter 181. The limiter, as explained previously, has applied thereto a signal representative of the quantity $(X_r)_{max}$, and limits the magnitude of the signal from the memory 120 that passes therethrough so that it does not exceed this maximum magnitude. As pointed out above, this represents the maximum amount of reformate that can be added to the blending line 29 in FIG. 1, and may reflect cost and supply data, for example, regarding the reformate component.

The signal from the limiter 181, representative of the new amount of reformate that is to be used for blending, is applied to control the valve 32 in the reformate line for as long as the gate 209 is gated open by the pulse signal $P_{14}$. As may be seen from the pulse waveform diagram of FIG. 9B, the pulse $P_{14}$ is generated until the next series of pulses $P_{15}$, $P_{16}$, $P_{17}$, $P_{18}$, and $P_{19}$ occurs. These latter five pulses are used for gating purposes during the control of the blending in accordance with the Reid vapor pressure of the finished blend. In this regard, although the pulse cycles $P_{10}$ through $P_{14}$ and $P_{15}$ through $P_{19}$ have been related to each other, they need not be so related, and each series may proceed independently of the other on its own cycle, with regard only to the flow velocity of the blend, so that a new change is not computed until a previous change has been completed.

As pointed out with regard to the blending of the fuel in accordance with the vapor/liquid ratio, the amounts of alkylate, light TCC gasoline, and butane components that are blended together must be changed concurrently with the change in the reformate component. To accomplish this, the pulse $P_{12}$ (lower portion of FIG. 4) passes through the OR gate 148 and gates open the gates 150, 151, 152 and 154 (FIG. 5) through the lead 303 so that signals representing the quantities $(X_c)_{old}$, $(X_r)_{old}$, $(X_b)_{old}$, and $(X_a)_{old}$, respectively, are gated into the memories 124, 125, 126 and 127, respectively, through the leads 304, 305, 306 and 350. As may be noted, the signals from the memories 124, 126 and 127 are summed together within the adder 155 to produce the sum in each of the denominators of the fractional components of Relations 26, 27 and 28. The signal from the adder 155 is applied to a linear gate 210 which is gated open by the pulse $P_{12}$ after passing through a suitable delay unit 211 (FIG. 4) in a lead 312. The signal from the gate 210 is applied to the memory 161 wherein it is stored and subsequently applied to the dividers 162, 164, 165 and 166 (FIG. 6) through the lead 321.

The divider 162, which also receives a signal through the lead 320 from the memory 124, produces an output signal which is representative of the fractional component of Relation 27. Similarly, as described in detail with respect to the vapor/liquid ratio control, the output signal from the divider 165 is representative of the fractional component of Relation 28, the output signal from the divider 166 is representative of the fractional component of Relation 26, and the output signal from the divider 164 is meaningless. The signals from the dividers 162, 165, and 166 are applied to the multipliers 170, 172 and 174, respectively, each of which is supplied with a signal representative of the quantity $(1-X_r)_{new}$ in Relations 26 to 28. This latter signal is generated as follows.

Referring to FIG. 4, the signal from the limiter 181, which is representative of the quantity $(X_r)_{new}$, not exceeding $(X_r)_{max}$, is applied through the diode 212 and the lead 325 to the subtracter 175 of FIG. 6. The subtracter, which is also supplied with a unity signal from the reference signal generator 65 of FIG. 8A, generates a signal representative of the quantity $(1-X_r)_{new}$.

The signal from the multiplier 170, which is representative of the right-hand side of Relation 27, i.e., the quantity $(X_c)_{new}$, is applied through the gate 190 and a lead 329 to the limiter 144 (FIG. 4) to control the valve 30 in the light TCC gasoline line. The control signal is limited to the magnitude $(X_c)_{max}$. The gate 190 is gated open by the pulse signal $P_{14}$ applied through a lead 330 and a diode 214.

Similarly, the signal from the multiplier 172, representative of the quantity $(X_b)_{new}$ in Relation 28, passes through the gate 182 and the lead 328 to the limiter 185 (FIG. 4) to control the setting of the valve 35 in the butane line. The gate 182 is also gated open by the pulse $P_{14}$ passing through the lead 330 and a diode 215.

Finally, the signal from the multiplier 174, representing the quantity $(X_a)_{new}$ in Relation 26, is applied through the gate 186 to the limiter 189, and thus controls the setting of the valve 26 in the alkylate line. The gate 186 is also gated open by the pulse $P_{14}$ passing through the lead 330 and a diode 216.

The signal from the multiplier 171, which represents meaningless information for the purpose of this computation, is blocked by the gate 179 which is not enabled at this time.

In this fashion the blending process is controlled in accordance with the distillation point of the finished blend, as well as in accordance with constraints established for the individual components of the blend.

REID VAPOR PRESSURE CONTROL

The expressions defining the relationships between fuel components in terms of the Reid vapor pressure for each component are developed in a fashion similar to that in which Relations 8 through 21 and 22 through 28 were developed to define the relationships between components in terms of their vapor/liquid ratios and distillation points, respectively. Thus it is assumed that the components blend volumetrically regarding Reid vapor pressure and that the actual non-linear blending relationships may be expressed by linear approximations. Further, it is assumed that Relation 9 is still controlling and that the presence of the anti-knock agent has no effect upon the Reid vapor pressure of the blend.

Accordingly, for a fuel blended from the components given in FIG. 1, the following relation expresses the Reid vapor pressure of the blended fuel in terms of the Reid vapor pressures of the individual components of the blend:

$$R = \frac{R_a X_a + R_c X_c + R_r X_r + R_b X_b}{X_a + X_c + X_r + X_b} \quad (29)$$

where $R$ is the Reid vapor pressure of the finished blend; $R_a$, $R_c$, $R_r$, and $R_b$ are the Reid vapor pressures of the alkylate, light TCC gasoline, reformate and butane components, respectively; and $X_a$, $X_c$, $X_r$, and $X_b$ are the volume fractions of the alkylate, light TCC gasoline, reformate, and butane components, respectively.

In a fashion similar to that in which Relations 10 and 23 were developed, the following volumetric average may be computed:

$$R_{avg.\ a,c,r} = \frac{R_a X_a + R_c X_c + R_r X_r}{X_a + X_c + X_r} \quad (30)$$

where $R_{avg.\ a,c,r}$ represents a volumetric average for the alkylate, light TCC gasoline, and reformate components of the mixture.

Manipulating Relations 29 and 30 in generally the same fashion as Relations 8, 9 and 10 were manipulated in Relations 11 through 16 and Relations 22 and 23 were manipulated, the following relation may be developed from Relations 29 and 30:

$$X_b{}^* - X_b{}^m = \frac{R^* - R^m}{R_b{}^* - R^*_{avg.\ a,c,r}} \quad (31)$$

where the factors in the relation are as defined above, with the asterisk denoting the magnitude of the factor for an ideal or desired mixture and the "$m$" prime denoting the actual magnitude of the factor as measured.

Relation 31, therefore, expresses a change in volume fraction of the butane component in terms of the difference between a desired Reid vapor pressure for the blend and an actual or measured Reid vapor pressure. Accordingly, the change in volume fraction of the butane component in Relation 31 represents the amount by which the volume fraction of that component must change to correct the Reid vapor pressure of the blend so that it conforms to that desired. Thus, the following relation may be developed to express a new volume fraction for the butane component when a change in volume fraction as given by Relation 31 is made to produce a desired Reid vapor pressure for the blend:

$$(X_b)_{new} = (X_b)_{old} + \frac{R^* - R^m}{R_b{}^* - R^*_{avg.\ a,c,r}} \quad (32a)$$

where $(X_b)_{new}$ represents the new volume fraction of the butane component and $(X_b)_{old}$ represents the previous volume fraction of the butane component at the time of measurement.

It is desirable, however, to define a new volume fraction for the butane component in terms of the amount needed to correct only partially for a particular Reid vapor pressure deviation from specification. Relation 32a, therefore, may be rewritten as follows:

$$(X_b)_{new} = (X_b)_{old} + T_4 \left[ \frac{R^* - R^m}{R_b{}^* - R^*_{avg.\ a,c,r}} \right] \quad (32b)$$

where $T_4$ is an attenuation factor between zero and 1, and $(X_b)_{new}$ is as defined above with the exception, however, that it does not reflect the fraction of butane needed in the blend to correct completely for a given deviation in Reid vapor pressure.

Thus, Relation 32b relates a new fraction of butane to the old or present fraction plus the Reid vapor pressure deviation from specification.

To retain the volume flow of the entire fuel blend constant, i.e., to satisfy Relation 9, the following Relations 33, 34, and 35 define the new volume fractions of the alkylate, light TCC gasoline and reformate components, respectively. In this regard, these three relations are similar to Relations 19 through 21 and 26 through 28, and ensure that each of the three components is changed so that its volume fraction bears the same proportion to the other two remaining components after a change as before the change.

$$(X_a)_{new} = \frac{(X_a)_{old}}{(X_a + X_c + X_r)_{old}} (1 - X_b)_{new} \quad (33)$$

$$(X_c)_{new} = \frac{(X_c)_{old}}{(X_a + X_c + X_r)_{old}} (1 - X_b)_{new} \quad (34)$$

$$(X_r)_{new} = \frac{(X_r)_{old}}{(X_a + X_c + X_r)_{old}} (1 - X_b)_{new} \quad (35)$$

where the factors in the relations are as defined above, with the subscripts "new" and "old" denoting the magnitude of the factors after and before a change, respectively.

As may be noted then, Relations 33, 34, and 35 relate the new volume fractions of the alyklate, light TCC gasoline, and reformate components of the blend, respectively, to the volume fractions existing at any particular time in the blending process and the new volume fraction established for the butane component. These relations, as well as Relation 32b are instrumented by the system shown in FIGS. 3 through 6.

The portion of the system of FIGS. 3 through 6 that instruments Relations 32b, 33, 34, and 35 uses pulse gating techniques similar to those employed in the octane number, vapor/liquid ratio, and distillation point control systems previously described. Thus five pulses, $P_{15}$, $P_{16}$, $P_{17}$, $P_{18}$, and $P_{19}$ from the timed pulse generator 90 of FIG. 9A, as shown in time in FIG. 9B, are used for gating purposes in the Reid vapor pressure control.

The timer of FIG. 10 may be used to generate the pulses $P_{15}$ through $P_{19}$. Thus, referring to that figure, when the relatively slowly revolving wiper 94 engages a contact 220, the potential of the battery 92 is applied through the contact to a series of AND gates 221, 222, 224, and 225. Thus, when the relatively rapidly revolving wiper 96 engages in succession the contacts 104, 105, 106, and 107, the AND gates 221, 222, 224, and 225 are sequentially enabled, thereby producing the pulses $P_{15}$, $P_{16}$, $P_{17}$, and $P_{18}$. After the pulse $P_{18}$ is generated, the relatively slowly revolving wiper 95 that moves with the wiper 94 engages an arcuate contact 226, thereby to produce the pulse $P_{19}$ of relatively long duration.

As may be seen from FIG. 10, a switch 227 is included in the circuit for producing the pulse $P_{19}$, and is designated as being closed after the first incidence of pulse $P_9$. This prevents pulse $P_{19}$ from being generated during the initial set of pulses $P_1$ through $P_4$, as shown in FIG. 9B. $P_{19}$ would be generated if the switch 227 were closed at all times. This ensures that the component flows for the alkylate, light TCC gasoline, reformate, and butane components remain fixed during the initial period when the system is first placed in operation in which octane number control is effected by changing the concentration of the anti-knock agent in the blend and the memories 120, 124, 125, 126, 127 and 161 contain no signals or signals from another different blending process therein. At the beginning of the entire process, then, all component valves 26, 30, 32, 35 and 37 are set manually and the system functions automatically thenceforth.

Referring to FIG. 4, the pulse $P_{15}$ (top of figure) resets memories 119 and 120, as well as memories 121 and 122 of FIG. 3 through the leads 300 and 301, respectively, memories 124, 125, 126, 127 of FIG. 5 through the lead 302, and the memory 161 of FIG. 5 through the lead 308, thereby to clear the memories of any signals previously stored therein.

The pulse $P_{16}$ (FIG. 3) simultaneously gates open linear gates 229, 230, 231, and 232. The gate 229 passes a signal from the Reid vapor pressure monitor 49 that is representative of the quantity $R^m$ in Relation 32b and applies the signal to the subtractor 134. The gate 230 passes a signal to the subtractor 134 from the reference signal generator 65 of FIG. 8A that is representative of the quantity $R^*$ in Relation 32b. The output signal from the subtractor 134 is representative of the numerator of the fractional component of Relation 32b, i.e., the difference between the Reid vapor pressure desired for the blended fuel and the Reid vapor pressure actually existing as measured by the Reid vapor pressure monitor 49. This signal is stored within the memory 121.

The gate 231 passes a signal to the subtractor 135 from the reference signal generator 65 of FIG. 8A that is representative of the quantity $R_b^*$ in Relation 32b. Similarly, the gate 232 passes a signal representative of the quantity $R^*_{\text{avg. a.c.r}}$ in Relation 32b from the reference signal generator 65 to the subtractor 135. The output signal from the subtractor 135 thus is representative of the denominator of the fractional component of Relation 32b, and this signal is applied to the memory 122 wherein it is stored.

The signals from the memories 121 and 122 are applied via the leads 298 and 299, respectively, to the divider 136 (FIG. 4) whose output signal, accordingly, represents the fractional component of Relation 32a. The output signal from the divider 136 is applied to the attenuator 133 which modifies the signal by the factor $T_4$ in Relation 32b. In this regard, the factor $T_4$ is equal to the factors $T_3$ and $T_2$ since the same attenuator 133 is used for all computations. The signal from the attenuator 133 thus is representative of the quantity in the right-most portion of Relation 32b, and because of the attenuation, positive protection is provided against wide fluctuations about the specification.

The signal from the attenuator 133 is applied to the adder 137 to which is also applied a signal from the memory 119 representative of the factor $(X_b)_{\text{old}}$ in Relation 32b. This latter signal is developed as follows.

The pulse signal $P_{17}$ (lower portion of FIG. 4) is applied as a gating signal to gate open a linear gate 234. When gated open, the gate 234 passes a signal from the meter 36 in the butane line representative of the present flow of butane to the blending line 29 of FIG. 1. The signal is applied to the recently reset memory 119 and is stored therein and applied to the adder 137.

The signal from the adder 137 is representative of the right-hand side of Relation 32b, i.e., the new fraction of butane necessary to be established in the blend to make all or part, depending upon the magnitude of the attenuation above, of the correction required to bring the Reid vapor pressure to specification. Successive cycles will thus effectively produce specification product. By spreading the correction needed over a number of cycles, the system is permitted to make other changes to correct for deviations in other parameters, and thereby accounts for the interdependency of the various specifications and also prevents wide fluctuations about the specifications.

The signal from the adder 137 is applied to the linear gate 140 which is gated open by the pulse $P_{18}$ to transmit the signal from the adder to the memory 120 for storage therein. The signal from the memory 120 is applied to a linear gate 236 which is gated open by the pulse $P_{19}$ to apply the signal from the memory to the limiter 185. The limiter, as explained previously, has applied thereto a signal representative of the quantity $(X_b)_{\text{max}}$, and limits the magnitude of the signal from the memory 120 that passes therethrough so that it does not exceed this maximum magnitude. As pointed out above, this represents the maximum amount of butane that can be added to the blending line 29 of FIG. 21, and may reflect cost and supply data, for example, regarding the butane component.

The signal from the limiter 185, representative of the new amount of butane that is to be used for blending, is applied to control the valve 35 in the butane line for as long as the gate 236 is gated open by the pulse signal $P_{19}$. As may be seen from the pulse waveform diagram of FIG. 9B, the pulse $P_{19}$ is generated through the following series of pulses $P_1$ through $P_4$ and terminates just prior to the occurrence of the pulses $P^5$ through $P_8$. Thus the flow of components to the blending line 29 of FIG. 1, other than that of the anti-knock agent, is rendered constant and continuous by the pulse $P_{19}$ throughout the period preceding and following that in which the octane number control is affected by a variation of the flow of anti-knock agent to the blending line. It should be understood, however, that the pulse signals $P_{15}$ through $P_{19}$ may proceed independently of the other series of pulses to establish the cyclical control of fuel blending in accordance with Reid vapor pressure in any predetermined cycle that is desired to be established.

Similarly to the blending of fuel in accordance with the vapor/liquid ratio and distillation point of the blend, the amounts of alkylate, light TCC gasoline, and reformate components that are blended together must be changed concurrently with the change in the butane component. To accomplish this, the pulse $P_{17}$ (lower portion of FIG. 4) passes through the OR gate 148 and through the lead 303 to gate open the gates 150, 151, 152, and 154 (FIG. 5) so that signals representing the quantities $(X_c)_{\text{old}}$, $(X_r)_{\text{old}}$, $(X_b)_{\text{old}}$, and $(X_a)_{\text{old}}$, respectively, from the leads 304, 305, 306, and 350 are gated into the memories 124, 125, 126, and 127, respectively. As may be noted, the signals from the memories 124, 125, and 127, are summed together within the adder 156 to produce the sum in each of the denominators of the fractional components of Relations 33, 34, and 35. The signal from the adder 156 is applied to a linear gate 239 which is gated open by the pulse $P_{17}$ from the lead 342 after passing through a suitable delay unit 240 (FIG. 4). The signal from the gate 239 is applied to the memory 161 wherein it is stored and subsequently applied via the lead 321 to the dividers 162, 164, 165, and 166 (FIG. 6).

The divider 162, which also receives a signal via the lead 320 from the memory 124, produces an output signal which is representative of the fractional component of Relation 34. Similarly, the output signal from the divider 164 is representative of the fractional component of Relation 35, and the output signal from the divider 166 is representative of the fractional component of Relation 33. The signals from the dividers 162, 164, and 166 are applied to the multipliers 170, 171, and 174, respectively, each of which is supplied with a signal representative of the quantity $(1-X_b)_{\text{new}}$ in Relations 33 through 35. This latter signal is derived as follows.

Referring to FIG. 4, the signal from the limiter 185, which is representative of the quantity $(X_b)_{\text{new}}$, not exceeding $(X_b)_{\text{max}}$, is applied through a diode 241 and the lead 325 to the subtracter 175 of FIG. 6. The subtracter, which is also supplied with a unity signal from the reference signal generator 65 of FIG. 8A, thus generates a signal representative of the quantity $(1-X_b)_{\text{new}}$.

The signal from the multiplier 170, which is representative of the right-hand side of Relation 34, i.e., the quantity $(X_c)_{new}$, is applied through the gate 190 and the lead 329 to the limiter 144 (FIG. 4) to control the valve 30 in the light TCC gasoline line. The control signal is limited to the magnitude $(X_c)_{max}$. The gate 190 is gated open by the pulse signal $P_{19}$ applied through the lead 340 and a diode 242.

Similarly, the signal from the multiplier 171, representative of the quantity $(X_r)_{new}$ in Relation 35, passes through the gate 179 and the lead 327 to the limiter 181 (FIG. 4) to control the setting of the valve 32 in the reformate line. The gate 179 is also gated open by the pulse $P_{19}$ passing through the lead 340 and a diode 244.

Finally, the signal from the multiplier 174, representing the quantity $(X_a)_{new}$ in Relation 33, is applied through the gate 186 to the limiter 189, and thus controls the setting of the valve 26 in the alkylate line. The gate 186 is also gated open by the pulse $P_{19}$ passing through the lead 340 and a diode 245.

The signal from the multiplier 172, which represents meaningless information for the purpose of this computation, is blocked by the gate 182 which is not enabled at this time.

In this fashion, the blending process is controlled in accordance with the Reid vapor pressure of the finished blend, as well as in accordance with the constraints established for the individual components of the blend.

BLENDING CONTROL.—INPUT AND OUTPUT MONITORING

In the three control schemes just described, i.e., vapor/liquid ratio control, distillation point control, and Reid vapor pressure control, the primary relationships instrumented by the system are given by Relations 17b, 25b, and 32b, respectively. Each of these relationships involves important assumptions. In particular, with regard to the vapor/liquid ratio control, it was assumed with reference to Relation 16 that $(V/L)_c^m$ is equal to $(V/L_c^*$, a constant, and that $(V/L)^m_{avg.\ a,\ r,\ b}$ is equal to $$(V/L)_{avg.\ a,\ r,\ b}$$

the latter quantity being taken as a constant for the purpose of the computation. Similarly, with regard to the distillation point control, it was assumed that $D_r^m$ is equal to $D_r^*$, a constant, and that $D^m_{avg.\ a,\ c,\ b}$ is equal to $D^*_{avg.\ a,\ c,\ b}$, the latter quantity being taken as another constant. Finally, with regard to the Reid vapor pressure control, it was assumed that $R_b^m$ is equal to $R_b^*$, a constant, and that $R^m_{avg.\ a,\ c,\ r}$ is equal to $R^*_{avg.\ a,\ c,\ r}$, the latter quantity being taken as still another constant.

Taking the vapor/liquid ratio control as an example, if the vapor/liquid ratio of the light TCC gasoline component changes appreciably, then the assumption that $(V/L)_c^m$ equals $(V/L)_c^*$, a constant, no longer is valid. In addition, as may be noted from Relation 10, such a change, as well as an appreciable change in the vapor/liquid ratio of any one or more of the other bulk components, renders invalid the assumption that $$(V/L)^m_{avg.\ a,\ r,\ b}$$

equals $(V/L)^*_{avg.\ a,\ r,\ b}$, and that the latter is a constant. Further, this assumption is also rendered invalid if the fractional contributions of the bulk components to the total blend also change appreciably, as also may be noted from Relation 10. Therefore, it may be preferable not to make these assumptions in developing Relation 16 from Relations 14 and 15. If the assumptions are not made, then the final relation 17b is as follows:

$$(X_c)_{new} = (X_c)_{old} + T_2 \left[ \frac{(V/L)^* - (V/L)^*_{avg.\ a,r,b}}{(V/L)^*_c - (V/L)^*_{avg.\ a,r,b}} - \frac{(V/L)^m - (V/L)^m_{avg.\ a,r,b}}{(V/L)^m_c - (V/L)^m_{avg.\ a,r,b}} \right]$$

(17c)

where the factors are each as defined above.

Relation 17c, then, defines a new volume fraction of light TCC gasoline component to established to compensate for all or part of a particular deviation from specification, depending upon the magnitude of the attenuation factor $T_2$. Signals representative of the factors $(X_c)_{old}$ and $(V/L)^m$ are generated by the meter 31 of FIG. 1 and the vapor/liquor ratio monitor 46 of FIG. 1, respectively. Signals representative of the factors $(V/L)^*$ and $(V/L)_c^*$, which are fixed and which are the ideal vapor/liquid ratios of the blend and light TCC gasoline component, respectively, may be generated by the reference signal generator 65 of FIG. 8A. With regard to the factor $(V/L)_c^m$, which is the actual vapor/liquid ratio of the light TCC gasoline component, a signal representative of this quantity may be generated by a vapor/liquid ratio monitor similar to the monitor 46. This monitor is coupled into the light TCC gasoline line adjacent the valve 30, for example, to monitor the component as it is applied to the blending pipeline 29.

With regard to the expression $(V/L)^*_{avg.\ a,\ r,\ b}$, signals representative of the component fractions $X_a$, $X_r$, and $X_b$ are involved in the expression, as may be seen from Relation 10. These signals are generated by the meters 27, 34, and 36, respectively. The factors $(V/L)_a^*$, $(V/L)_r^*$, and $(V/L)_b^*$ are all constant in this case and are the ideal vapor/liquid ratios of the alkylate, reformate, and butane components, respectively. Signals representative of these factors may be generated by the reference signal generator 65 of FIG. 8A, and are only changed from time to time when a blending formula is modified, for example, to incorporate components of different ideal characteristics.

With regard to the factor $(V/L)^m_{avg.\ a,\ r,\ b}$, as may be seen from Relation 10, this requires signals representative of the component fractions $X_a$, $X_r$, and $X_b$ which are generated as described above. The factors $(V/L)_a^m$, $(V/L)_r^m$, and $(V/L)_b^m$ are the actual vapor/liquid ratio characteristics of the alkylate, reformate, and butane components, respectively. Signals representative of these factors may be generated by vapor/liquid ratio monitors similar to the monitor 46 of FIG. 1. Each of these monitors is coupled to a different one of the lines from the component sources 20, 22, and 24 that lead to the blending pipeline 29. For example, a different monitor may be coupled into a different one of the lines adjacent the valves 26, 32, and 35.

The multiplications, additions, and divisions indicated in Relation 10 required to generate the signals $$(V/L)^*_{avg.\ a,\ r,\ b}$$

and $(V/L)^m_{avg.\ a,\ r,\ b}$ from the signals representative of the individual factors thereof may be carried out by the use of conventional multipliers, adders, and dividers similar to the components already shown in the drawings and described above. Further, conventional circuit components such as these may be employed to combine the signals as indicated in Relation 17c to produce an output signal representative of $(X_c)_{new}$. In particular, turning to FIG. 4, the memory 119 supplies a signal representative of the factor $(X_c)_{old}$ to the adder 137, while the signal from the attenuator 133 is equal to the bracketed expression in the right-hand side of Relation 17c times the attenuation factor $T_2$. In this instance, the divider 136 and the circuitry of FIG. 3 are replaced by the conventional multipliers, adders, and dividers specified above to carry out the mathematical manipulations indicated to produce the bracketed expression in the right-hand side of Relation 17c.

In this fashion, the blended fuel product as well as the component fuel products are all monitored to effect blending control in accordance with the vapor/liquid ratios of all of these products and to correct for changes therein.

Similarly, with regard to the distillation point control, if the assumptions indicated above with respect to Relation 25b are not made, then Relation 25b is expressed as follows:

$$(X_r)_{new} = (X_r)_{old} + T_3\left[\frac{D^* - D^*_{avg.\,a,\,c,\,b}}{D_r^* - D^*_{avg.\,a,\,c,\,b}} - \frac{D^m - D^m_{avg.\,a,\,c,\,b}}{D_r^m - D^m_{avg.\,a,\,c,\,b}}\right] \quad (25c)$$

where the factors involved are all as defined above.

As may be noted, Relation 25c is similar to Relation 17c and may be instrumented in much the same fashion. In this instance, however, signals representative of the distillation point characteristics of the individual bulk components are required, and these signals may be generated by distillation point monitors similar to the monitor 47 of FIG. 1, each of which is coupled into a different one of the component lines leading from the component sources 20, 21, 22, and 24 to the blending pipeline 29.

Finally, with regard to the Reid vapor pressure control, Relation 32b is expressed as follows if the assumptions above are not made:

$$(X_b)_{new} = (X_b)_{old} + T_4\left[\frac{R^* - R^*_{avg.\,a,\,c,\,r}}{R_b^* - R^*_{avg.\,a,\,c,\,r}} - \frac{R^m - R^m_{avg.\,a,\,c,\,r}}{R_b^m - R^m_{avg.\,a,\,c,\,r}}\right] \quad (32c)$$

where the factors involved are all as defined above.

Relation 32c is similar to relations 25c and 17c and is instrumented in much the same fashion. Signals are required representative of the Reid vapor pressure characteristics of the individual bulk components, and thus Reid vapor pressure monitors similar to the monitor 49 of FIG. 1 may be installed in the component lines leading from the sources 20, 21, 22, and 24 to the blending pipeline 29.

As may be seen, then, the blending control takes into account all inter-related characteristics of the component products as well as the blended product, and compensates for all changes in these characteristics.

BLENDING CONTROL.—DETAIL II

The system shown in detail in FIGS. 2 through 10 is but one blending system in accordance with the invention. Table 1, as follows, is a sample data matrix for another fuel blending system which effects the blending of a fuel product from a plurality of component products in accordance with a plurality of characteristics of the products as well as other limiting constraints incorporated as control factors. The system operates to correct simultaneously for product deviations from a plurality of specifications, while at the same time optimizing, i.e., producing a blended fuel product at minimum cost.

is to be blended so that it meets specifications concerning octane number, vapor/liquid ratio, distillation point, and Reid vapor pressure. Additionally, the system effects blending in accordance with the factors just mentioned and, at the same time, chooses a blend that minimizes costs.

In Table 1, $X_a$, $X_c$, $X_r$ and $X_b$ represent the fractions of the total blend accounted for by the alkylate, light TCC gasoline, reformate, and butane components, respectively. $X_1$, $X_2$, and $X_3$ represent portions of projections of straight line segments that approximate the curve graphically defining octane number of a blend of gasoline in terms of the concentration of anti-knock agent in the blend. Such a curve is shown in FIG. 12, and is approximated by three linear segments $S_1$, $S_2$, and $S_3$ having projections $X_{1(max)}$, $X_{2(max)}$, and $X_{3(max)}$ on the octane number axis. This technique, which simplifies the computations involved in comparison with those involved when the expression $a+bL+cL^2+dL^3+eL^4$ is used in Relation 1 to define the effect of the anti-knock agent concentration upon octane number, is described in detail in an article entitled, "Applications of Linear Programming in the Oil Industry," by W. W. Garvin, H. W. Crandall, J. B. John, and R. A. Spellman (3 Management Science No. 4, pp. 407–430, July 1957). Of course, any number of linear segments may be chosen to approximate the actual curve.

Thus the octane number (O) of the finished blend of fuel is expressed by the following relation:

$$O = O_a^\circ X_a + O_c^\circ X_c + O_r^\circ X_r + O_b^\circ X_b + X_1 + X_2 + X_3 \quad (36)$$

where $O_a^\circ$, $O_c^\circ$, $O_r^\circ$, and $O_b^\circ$ are the octane numbers of the alkylate, light TCC gasoline, reformate, and butane components, respectively, without any anti-knock agent added thereto, and $X_1$, $X_2$, and $X_3$ are as defined above. The dimensions of the terms are all octane fractions, and, in this regard, the quantity $(X_a + X_c + X_r + X_b)$ is omitted as a multiplier in the left-hand side of Relation 36 and in the right-hand side with regard to $X_1$, $X_2$, and $X_3$ since, from Relation 9, it is equal to 1.

Given a set of values $X_a$, $X_c$, $X_r$, and $X_b$ in Relation 36, the response of the blend to anti-knock agent is graphically shown in FIG. 12, where the base level $O^\circ$ of the octane number axis is equal to the expression $O_a^\circ X_a + O_c^\circ X_c + O_r^\circ X_r + O_b^\circ X_b$ in Relation 36. For this blend of gasoline formed with a particular concentration of anti-knock agent, represented by a point on the curve of FIG. 12, the corresponding octane number addition is determined from the projection of the point on the octane number axis. If the point lies on the curve segment $S_1$, $X_1$ has a value between zero and $(X_1)_{max}$, and $X_2$ and $X_3$ are equal to zero. If the point lies on the segment $S_2$, $X_1$ is equal to $(X_1)_{max}$, $X_2$ has a value be-

TABLE 1.—SAMPLE DATA MATRIX FOR COMPUTING OPTIMUM BLEND COMPOSITION

| Constraints | Component Fractions | | | | Anti-Knock Agent Curve Segment | | | Specification Values |
|---|---|---|---|---|---|---|---|---|
| | $X_a$ | $X_c$ | $X_r$ | $X_b$ | $X_1$ | $X_2$ | $X_3$ | |
| Octane Number | $O_a^\circ$ | $O_c^\circ$ | $O_r^\circ$ | $O_b^\circ$ | +1 | +1 | +1 | $\{\geq O_{LC}+T_1(O^*-O^m)$ $\{\leq O_{LC}+T_1(O^*-O^m)+K$ |
| Anti-Knock Agent Segment (1) Limit | $K_a$ | $K_c$ | $K_r$ | $K_b$ | +1 | | | $\leq P$ |
| Anti-Knock Agent Segment (2) Limit | $K_a'$ | $K_c'$ | $K_r'$ | $K_b'$ | | +1 | | $\leq P'$ |
| Anti-Knock Agent Segment (3) Limit | $K_a''$ | $K_c''$ | $K_r''$ | $K_b''$ | | | +1 | $\leq P''$ |
| Vapor/Liquid Ratio | $(V/L)_a$ | $(V/L)_c$ | $(V/L)_r$ | $(V/L)_b$ | | | | $\leq (V/L)_{LC}+T_2[(V/L)^*-(V/L)^m]$ |
| Distillation Point | $D_a$ | $D_c$ | $D_r$ | $D_b$ | | | | $\leq D_{LC}+T_3(D^*-D^m)$ |
| Reid Vapor Pressure | $R_a$ | $R_c$ | $R_r$ | $R_b$ | | | | $\leq R_{LC}+T_4(R^*-R^m)$ |
| Optimizing Criteria (e.g., costs) | $\$/B_a$ | $\$/B_c$ | $\$/B_r$ | $\$/B_b$ | $\$/X_1$ | $\$/X_2$ | $\$/X_3$ | Minimize. |
| Production Requirement | +1 | +1 | +1 | +1 | | | | $=1$ |

In Table 1, for the purpose of illustration only it is assumed that the fuel components shown in FIG. 1 are to be blended. In this case, then, the blended fuel is assumed to be a premium grade of gasoline formed from four bulk components, namely, alkylate, light TCC gasoline, reformate, and butane, as well as a non-bulk anti-knock agent such as TEL, for example. Further, and again only for the purpose of illustration, it is assumed that the fuel tween zero and $(X_2)_{max}$, and $X_3$ is equal to zero. If the point lies on the segment $S_3$, $X_1$ is equal to $(X_1)_{max}$, $X_2$ is equal to $(X_2)_{max}$, and $X_3$ has a value between zero and $(X_3)_{max}$.

Relation 36 may also be expressed as follows:

$$O_a^\circ X_a + O_c^\circ X_c + O_r^\circ X_r + O_b^\circ X_b + X_1 + X_2 + X_3 \geq O_{LC} + T_1(O^*-O^m) \quad (37a)$$

where $O_{LC}$ is the octane number last computed for the blend, $O^*$ is the octane number desired for the blend, $O^m$ is the octane number actually measured for the blend, and $T_1$ is an attenuation factor between zero and 1.

The factor $(O^*-O^m)$ represents the deviation of the octane number of the finished blend of fuel from the octane number desired for the blend. Therefore, Relation 37a indicates that the octane number of the finished blend must be greater than or equal to the octane number computed for the blend when the previous change in octane number was effected plus the present octane deviation times the attenuation factor $T_1$. The attenuatiton factor ensures that any correction made for octane deviation will be less than that required to correct for the entire deviation. In this fashion, entire corrections are made in more than one step, which prevents excessive "hunting" and wide oscillations that might occur if the system attempted to correct deviations in one step.

Bearing Relation 37a in mind, the following relation may be written:

$$O_a^o X_a + O_c^o X_c + O_r^o X_r + O_b^o X_b + X_1 + X_2 + X_3 \leq O_{LC} + T_1(O^*-O^m) + K \quad (37b)$$

where K is a predetermined constant.

Relation 37b indicates that the octane number of the finished blend must not exceed the lower limit of the newly computed octane number of the blend, as expressed by the right-hand side of Relation 37a, by more than a predetermined constant K, which represents the quality "give-away" that may be tolerated. As pointed out previously, quality give-away is costly, and therefore, it is highly desirable to limit the amount by which the octane number of the finished blend may exceed its predetermined specification. Since the system is optimizing as indicated above, octane number give-away will only occur to the extent that it is necessary to meet the other requirements and constraints established for the system. In acual practice, then, with the flexibility available to change anti-knock concentration, octane number give-away is never really a problem. However, from a blending technology standpoint, the maximum limitation on octane number as expressed by Relation 37b is useful.

In Table 1, the factors involved in Relations 37a and 37b are included in the row entitled OCTANE NUMBER.

Turning to FIG. 13, signals representative of the quantities $O_a^o$, $O_c^o$, $O_r^o$, and $O_b^o$ are applied from a signal generator 350 to a computer 352, which may be a conventional general purpose digital computer such as an IBM 650 or a Bendix G-15, for example. These signals, which represent the octane number characteristics of the blend components without the addition of any anti-knock agent, may be generated by apparatus similar to the reference signal generator of FIG. 8A if it is assumed that they remain relatively fixed. On the other hand, to take into account fluctuations in component characteristics, the signals may be generated by octane number monitors similar to the monitor 45 of FIG. 1, each of which is coupled into a different component line. For example, the monitors may be coupled into the lines adjacent the valves 26, 30, 32, and 35. An analog to digital converter (not shown), of any suitable conventional form, may be needed, however, to convert the signals to a form suitable for handling by the computer 352 if it is a digital computer.

Signals representative of the factors $$O_{LC}+T_1(O^*-O^m)$$

and $O_{LC}+T_1(O^*-O^m)+K$ from Table 1 are also applied to the computer 352 from the source 3350. These latter signals, representing the octane number specification values for the computer, may be generated by a circuit similar to that shown in FIG. 14. Referring to that figure, the octane number monitor 45 applies a signal representative of the quantity $O^m$ to a subtracter 356, to which is also applied a signal representative of the quantity $O^*$ from the reference signal generator 65 of FIG. 8A. The output signal from the subtracter 356, which is representative of the quantity $O^*-O^m$, is applied through an attenuator 357, which modifies the signal by the factor $T_1$, to an adder 358 to which is applied a signal in analog form from the computer 352 representative of the factor $O_{LC}$ from Table 1. This latter signal is stored in the computer 352 and is representative of the octane number computed for the previous blend change. The output signal from the adder 358, then, is representative of the expression in the right-hand side of Relation 37a, i.e., $O_{LC}+T_1(O^*-O^m)$, and defines a lower limit for the newly computed octane number of the blend. This signal is applied to the computer 352 after passing through an analog to digital converter 359 to provide a signal suitable for handling by the computer if it is a digital computer.

The signal from the adder 358 is also applied to an adder 360 that is supplied with a signal representative of the quantity K from Table 1 which may be generated by the reference signal generator 65 of FIG. 8A. Thus the output signal from the adder 360 is representative of the expression in the right-hand side of Relation 37b, i.e., $O_{LC}+T_1(O^*-O^m)+K$, and represents an upper limit on the newly computed octane number of the finished blend. This signal is applied to an analog to digital converter 361, if necessary, and thence to the computer 352.

Table 1 incorporates data regarding a limitation on the length of each of the three anti-knock agent linear curve segments $S_1$, $S_2$, and $S_3$ of FIG. 12. In Table 1, this data is included as a limitation on the maximum magnitude of each of $X_1$, $X_2$, and $X_3$, i.e., $(X_1)_{max}$, $(X_2)_{max}$, and $(X_3)_{max}$, respectively, which, as explained above, are projections on the octane axis of the linear segments $S_1$, $S_2$, and $S_3$, respectively. Regarding $X_1$, the following relation may be written:

$$K_a X_a + K_c X_c + K_r X_r + K_b X_b + X_1 \leq P \quad (38)$$

where $K_a$, $K_c$, $K_r$, and $K_b$ are predetermined constants relating the blend composition, formed from particular quantities of the alkylate $(X_a)$, light TCC gasoline $(X_c)$, reformate $(X_r)$, and butane $(X_b)$ components, respectively, with the maximum octane improvement that can be obtained as a result of adding anti-knock agent at the rate shown by the first segment $S_1$ in FIG. 12. The limit thus imposed on $X_1$ is given by P, which is an empirically determined constant in the linear relationship between blend susceptibility to anti-knock agent and the maximum permissible length of segment $S_1$ projected as $X_1$ on the octane axis. The constant P can have either a positive or negative value.

The factors in Relation 38 are included in Table 1 in the row entitled "Anti-knock Agent Segment (1) Limit." Turning to FIG. 13, signals representing all these factors are applied from a signal source 362 to the computer 352. These signals, since they are all predetermined constants, may be generated by apparatus similar to the reference signal generator 65 of FIG. 8A after passing through an appropriate analog to digital converter (not shown), if required.

Similarly, regarding $X_2$:

$$K'_a X_a + K'_c X_c + K'_r X_r + K'_b X_b + X_2 \leq P' \quad (39)$$

where $K'_a$, $K'_c$, $K'_r$, and $K'_b$ are predetermined constants relating the blend composition, formed from the predetermined quantities of alkylate, light TCC gasoline, reformate, and butane components, respectively, in the computation regarding the segment $S_1$ limit, with the maximum octane improvement that can be obtained as a result of adding anti-knock agent at the rate shown by the second segment $S_2$ in FIG. 12. $P'$ represents the limit thus imposed on $X_2$.

In this regard, the segment $S_2$ is related to $S_1$ as follows. If the limit P imposed on $X_1$ falls short of providing a predetermined octane number, and more octane number is achieved by adding anti-knock agent, the agent is added according to the slope of the second segment $S_2$. As may be noted, more anti-knock agent must be used to give an improvement of one octane number in the second segment than is required in the first segment.

The factors of Relation 39 are included in Table 1 in the row entitled "Anti-knock Agent, Segment (2) Limit." Turing to FIG. 13, a signal source 363 generates signals represenative of these factors and applies them to the computer 352. Since the factors in the relation are all constant, the signals representing them may be generated, for example, in a fashion similar to that in which the signals from the source 362 are generated.

Finally, regarding $X_3$:

$$K''_a X_a + K''_c X_c + K''_r X_r + K''_b X_b + X_3 \leq P'' \quad (40)$$

where $K''_a$, $K''_c$, $K''_r$, and $K''_b$ are predetermined constants relating the blend composition formed from the predetermined quantities of alkylate, light TCC gasoline, reformate, and butane components, respectively, in the computations regarding the limits of segments $S_1$ and $S_2$, with the maximum octane improvement that can be obtained as a result of adding anti-knock agent at the rate shown by the third segment $S_3$ in FIG. 12. $P''$ represents the limit thus imposed on $X_3$.

In this regard, the segment $S_3$ is related to the segments $S_1$ and $S_2$ as follows. If the limits P and $P'$ imposed on $X_1$ and $X_2$, respectively, fall short of providing a predetermined octane number, and more octane number is achieved by adding anti-knock agent, the agent is added according to the slope of the third segment $S_3$. As may be noted, more anti-knock agent must be used to give an improvement of one octane number on the third segment $S_3$ than is required in either the first segment $S_1$ or the second segment $S_2$. The factors of Relation 40 are included in Table 1 in the row entitled "Anti-knock Agent, Segment (3) Limit." Turning to FIG. 13, signals representative of all these factors are applied to the computer 352 from a signal source 364 similar to the sources 362 and 363.

With regard to the vapor/liquid ratio of the blended fuel, this is assumed to be governed by Relation 8 above, and the data from this relation is incorporated in Table 1 as indicated in the row entitled "Vapor Liquid Ratio." For the purpose of the present computation, however, Relation 8 above may be rewritten in the following form:

$$(V/L)_a X_a + (V/L)_c X_c + (V/L)_r X_r + (V/L)_b X_b \leq (V/L)_{LC} + T_2 [(V/L)^* - (V/L)^m] \quad (41)$$

where $(V/L)_{LC}$ is the vapor/liquid ratio last computed for the blend, $(V/L)^*$ is the vapor/liquid ratio desired for the blend, $(V/L)^m$ is the vapor/liquid ratio actually measured for the blend, and $T_2$ is an attenuation factor like $T_1$ of Relations 37a and 37b, which has a value between zero and 1.

The factor $(V/L)^* - (V/L)^m$ represents the deviation of the vapor/liquid ratio of the finished blend of fuel from that desired. Therefore, Relation 41 indicates that the vapor/liquid ratio of the finished blend must be less than or equal to the vapor/liquid ratio last computed for the blend when the previous change in vapor/liquid ratio was effected plus the vapor/liquid ratio deviation times the attenuation factor $T_2$.

Turning to FIG. 13, a signal source 368 supplies signals to the computer 352 representative of the factors included in Relation 41. Signals representative of the factors $(V/L)_a$, $(V/L)_c$, $(V/L)_r$, and $(V/L)_b$ may be generated by the reference signal generator 65 of FIG. 8A, for example, after passing through a suitable analog to digital converter (not shown), if necessary, if it is assumed that these factors remain relatively fixed. On the other hand, to take into account variations in component characteristics, the signals may be generated by vapor/liquid ratio monitors similar to the monitor 46 of FIG. 1, each of which is coupled into a different bulk fuel component line. For example, the monitors may be coupled into the bulk fuel component lines adjacent the valves 26, 30, 32, and 35.

A signal representative of the expression in the right-hand portion of Relation 41 may be generated by the apparatus shown in FIG. 15. Signals from the vapor/liquid ratio monitor 46, representing the factor $(V/L)^m$, are applied to a subtracter 370. The subtracter 370 is also supplied with a signal from the reference signal generator 65 of FIG. 8A, for example, representative of the factor $(V/L)^*$. The signal from the subtracter, accordingly, is representative of the deviation of the vapor/liquid ratio of the blend as actually measured from that desired, and this signal is applied through an attenuator 371, which modifies the signal by the factor $T_2$, to an adder 372. The adder 372 is also supplied with a signal from the computer 352 in analog form representing the factor $(V/L)_{LC}$, i.e., the vapor/liquid ratio as computed for the previous blend change. Accordingly, the signal from the adder 372 is representative of the right-hand side of Relation 41, and this signal, after passing through a suitable analog to digital converter 373, if necessary, is applied to the computer 352 of FIG. 13.

Similarly, the distillation point of the blend is assumed to be defined by Relation 22 above, and the data from this relation is inserted into Table 1 as indicated in the row entitled "Distillation point." For the purpose of the present computation, however, Relation 22 may be re- $$D_a X_a + D_c X_c + D_r X_r + D_b X_b \leq D_{LC} + T_3 (D^* - D^m) \quad (42)$$

where $D_{LC}$ is the distillation point last computed for the blend, $D^*$ is the distillation point desired for the blend, $D^m$ is the distillation point actually measured for the blend, and $T_3$ is an attenuation factor between zero and 1, similar to $T_2$ described above.

The factor $(D^* - D^m)$ represents the deviation of the distillation point of the finished blend of fuel from that desired. Therefore, Relation 42 indicates that the distillation point of the finished blend must be less than or equal to the distillation point last computed plus the distillation point deviation times the attenuation factor $T_3$.

Turning to FIG. 13, signals representing the factors involved in Relation 42 are generated by a signal source 374 and applied to the computer 352. Signals representative of the factors $D_a$, $D_c$, $D_r$, and $D_b$ may be generated by the reference signal generator 65 of FIG. 8A, for example, or the signals may be generated by distillation point monitors similar to the monitor 47 of FIG. 1, each of which is coupled into a different bulk fuel component line.

The signal representing the right-hand side of Relation 42 may be generated by a circuit similar to that shown in FIG. 15, with the distillation point monitor 47 substituted for the vapor/liquid ratio monitor 46 and a signal representative of the factor $D^*$ applied to the subtractor 370. Further, the attenuator 371 modifies the signal applied thereto by the factor $T_3$ and the adder 372 is supplied with a signal in analog form from the computer 352 representative of the factor $D_{LC}$, i.e., the distillation point last computed for the previous blend change.

Finally, the Reid vapor pressure of the blended fuel is assumed to be governed by Relation 29 above, and the pertinent information from this relation is included in Table 1 in the row entitled "Reid Vapor Pressure." The present computation may be simplified, however, if Relation 29 is rewritten as follows:

$$R_a X_a + R_c X_c + R_r X_r + R_b X_b \leq R_{LC} + T_4 (R^* - R^m) \quad (43)$$

where $R_{LC}$ is the Reid vapor pressure last computed for the blend, $R^*$ is the Reid vapor pressure desired for the blend, $R^m$ is the Reid vapor pressure actually measured for the blend, and $T_4$ is an attenuation factor between zero and 1.

The factor $(R^* - R^m)$ represents the deviation of the Reid vapor pressure of the finished blend of fuel from that desired. Therefore, Relation 43 indicates that the Reid vapor pressure of the finished blend must be less than or equal to the Reid vapor pressure last computed plus the Reid vapor pressure deviation times the attenuation factor $T_4$.

Turning to FIG. 13, signals representative of the factors involved in Relation 43 are applied to the computer 352 from a signal source 376. The signals $R_a$, $R_c$, $R_r$, and $R_b$ may be generated by the reference signal generator 65 of FIG. 8A, for example, or the signals may be generated by Reid vapor pressure monitors similar to the monitor 49 of FIG. 1, each of which is coupled into a different bulk fuel component line.

The signal representative of the right-hand side of Relation 43 may be generated by a circuit similar to that shown in FIG. 15. In this case, however, the vapor/liquid ratio monitor 46 is replaced by the Reid vapor pressure monitor 49, and the subtracter 370 is supplied with a signal from the reference signal generator 65 of FIG. 8A that is representative of the factor $R^*$. Further the attenuator 371 modifies the signal applied thereto by the factor $T_4$ and the adder 372 is supplied with a signal in analog form from the computer 352 which is representative of the factor $R_{LC}$, i.e., the Reid vapor pressure last computed for the previous blend change.

Table 1 includes data regarding optimizing criteria, for example, such as costs, which are to be minimized in the blending process at the same time that changes are effected to maintain the product in accord with specifications. The expressions $/B_a$, $/B_c$, $/B_r$, and $/B_b$ represent the costs expressed in dollars per barrel, for example, of the alkylate, light TCC gasoline, reformate, and butane components, respectively. Similarly, the cost of the anti-knock agent is expressed in terms of its linear curve segments, with the expression $/X_1$, $/X_2$, and $/X_3$ representing the costs expressed in dollars per octane barrel, for example, of the curve segments represented by $X_1$, $X_2$, and $X_3$, respectively. Table 1 indicates in the column entitled "Specification values" that costs are to be minimized.

Turning to FIG. 13, signals representative of the factors involved in the cost constraint are applied to the computer 352 from a signal source 378. There signals, may be generated by the reference signal generator 65 of FIG. 8A after passing through a suitable analog to digital converter (not shown), if necessary. The signals representative of the cost factor may be changed as desired to reflect changing conditions in the refinery operations that result in changes in availability or difficulty in manufacture of individual components, for example. Thus, when an otherwise readily available component is temporarily scarce due to unforeseen events in refinery operation, for example, the cost of the appropriate component can be temporarily increased. Computation techniques are known and currently used by refinery technicians for establishing appropriate relative values of $/B_a$, $/B_c$, $/B_r$, and $/B_b$ to represent any refinery situation whether normal or abnormal.

Finally, Table 1 includes a constraint entitled "Production Requirements". This expresses Relation 9 above, namely, that the sum of the computed volume fractions $X_a$, $X_c$, $X_r$, and $X_b$ total 1. In the system of FIG. 13, this is programmed directly into the computer 352.

As may be seen, then, Table 1 includes data pertinent to all the characteristics of the fuel products that are monitored and according to which blending is effected, as well as cost and other specifications that are to be met. Signals representing this data are applied to the computer, as shown in FIG. 13, and the computer is programmed with a general linear program for handling the data of Table 1 and for performing the computations indicated. The book, "Introduction to Linear Programming" by W. W. Garwin (McGraw-Hill Book Co., 1960), especially in Chapter 3, explains the actual computational procedure that is followed by the computer to solve the equations represented by the data matrix of Table 1. The detailed program itself that effects this actual computational procedure is a general program such as may be written by anyone skilled in the art.

The programmed computer manipulates the information of Table 1 and produces a series of output signals representative of the fraction of the blend to be established for each of the alkylate, light TCC gasoline, reformate, and butane components, as well as the concentration of anti-knock agent, all to correct simultaneously for the deviations in octane number, vapor/liquid ratio, distillation point, and Reid vapor pressure, and establishing the blend at a minimum cost. The signals from the computer represents $X_a$, $X_c$, $X_r$, $X_b$, $X_1$, $X_2$, and $X_3$, as shown in the output block 380 of FIG. 13. Insofar as $X_1$, $X_2$, and $X_3$ are concerned, the computer converts the signals representative of these factors, which have the dimensions of octane fractions, to a single signal representative of the sum:

$$C_1X_1 + C_2X_2 + C_3X_3 = L \qquad (44)$$

where $C_1$, $C_2$, and $C_3$ are predetermined constants that relate $X_1$, $X_2$, and $X_3$, respectively, to the amount of anti-knock agent (L) in cc./gal., e.g., to be added to the blend. In particular, referring to FIG. 12, $C_1(X_1)_{max}$ is the projection on the anti-knock agent axis of the linear segment $S_1$, and $C_1$ may be computed from the well known relationships regarding the right triangle formed by $(X_1)_{max}$, $S_1$, and $C_1(X_1)_{max}$. Similarly, $C_2(X_2)_{max}$ and $C_3(X_3)_{max}$ are the projections on the anti-knock agent axis of the linear segments $S_2$ and $S_2$, respectively.

The single signal representative of L in Relation 44, as well as the signals representative of $X_a$, $X_c$, $X_r$, and $X_b$, are applied to the valves 37, 26, 30, 32, and 35, respectively, shown in FIG. 1 to control the blending of the finished fuel product. The computations are repeated at any desired frequency, and the blend is continuously monitored according to octane number, vapor/liquid ratio, distillation point, and Reid vapor pressure to effect blending control at a minimum cost blend.

Thus, there have been described two exemplary systems for the blending of a fuel product from a plurality of component products in accordance with a plurality of characteristics of the products. The products are continuously sampled and characteristics thereof determined so that the specifications, which may take the form of various constraints on the characteristics of the finished blend as well as other criteria, such as the minimizing of costs, the control of quality, and a limitation on use of selected components, for example, may be continuously satisfied.

It will be understood by those skilled in the art, that the above described embodiments are merely exemplary and that they are susceptible of modification and variation without departing from the spirit and scope of the invention. For example, although certain criteria were specified in the exemplary embodiments described, the invention is not limited thereto. Further, the invention is not to be deemed limited in any way to the blending of the particular components used for the purpose of illustration in the application, but has application in the blending of any fluid product from a plurality of component products in accordance with a plurality of product characteristics and other constraints.

In addition, although the embodiments described above relate to the blending of a finished blend of fuel, i.e., a premium grade of gasoline in the examples chosen, the invention may be employed to effect substream blending. That is, component streams may be blended together to form a single substream that is only a component of a finished blend of fuel rather than the finished blend itself. The substream may be monitored to detect selected characteristics thereof, and the blending of the components changed in accordance with the detected characteristics to maintain the substream at predetermined specifications. Thus, the monitoring and blending of components in accordance with the invention may be effected at all the stages of a blending operation.

Accordingly, the invention is not to be demand limited except as it is defined in the following claims.

We claim:

1. In apparatus for automatically blending a motor fuel from a plurality of components, means including a single-cylinder internal-combustion engine performing no useful work and having a repetitive operating cycle for generating a first signal representative of the actual octane number of said motor fuel and for generating a second signal representative of the desired octane number of said motor fuel; means responsive to said first and second signals for generating a first error signal which is a function of the deviation of said first signal from said second signal; means for generating a third signal representative of the actual value of at least one of the following additional characteristics of said motor fuel: vapor/liquid ratio, distillation point, and Reid vapor pressure and for generatng a fourth signal representative of the desired value of said one additional characteristic; means for generating a second error signal which is a function of the deviation of said third signal froms aid fourth signal; and control means responsive to said first and second error signals for generating first and second control signals for varying the proportions of the components blended together so that said motor fuel meets predetermined specifications regarding octane number and said one additional characteristic.

2. In combination with apparatus as recited in claim 1, means for diverting said motor fuel away from a normal course of flow if either of said octane number and said one additional characteristic deviates from a predetermined range established therefor.

3. Apparatus as recited in claim 1 wherein said control signals are generated sequentially, said first control signal varying the proportions of the components blended together in such a way as to reduce the deviation of said first signal from said second signal and said second control signal varying the proportions of the components blended together in such a way as to reduce the deviation of said third signal from said fourth signal.

4. Apparatus as recited in claim 3 wherein each control signal corrects only partially for one of the deviation of said first signal from said second signal and the deviation of said third signal from said fourth signal.

5. In combination with apparatus as recited in claim 3, means for maintaining substantially constant the rate of blending of said motor fuel.

6. Apparatus as recited in claim 1 in which the rate of addition of a first component of said motor fuel is changed in response to said first control signal, the rates of addition of the remaining components being in substantially in the same proportion to each other after a change is made in the rate of addition of said first component as before, and the rate of addition of a second component of said motor fuel is changed in response to said second control signal, the rates of addition of the remaining components being in substantially the same proportion to each other after a change is made in the rate of addition of said second component as before.

7. In combination with apparatus as recited in claim 1, means for limiting the amount of each component that may be added to the motor fuel.

8. Apparatus as recited in claim 1 wherein one of said components is a relatively non-bulk anti-knock agent and wherein said control means includes means for varying the amount of said anti-knock agent forming a part of said motor fuel substantially in accordance with the following expression:

$$\frac{\Delta O}{b+2cL+3dL^2+4eL^3}$$

where $\Delta O$ is the difference between the actual octane number and the desired octane number; L is the current amount of anti-knock agent forming a portion of the motor fuel; and $b$, $c$, $d$, and $e$ are predetermined constants.

9. Apparatus as recited in claim 1 wherein at least two of said components are relatively bulk fuel components and wherein said control means includes means for varying the amount of one of said bulk fuel components forming a part of said motor fuel substantially in accordance with the following expression:

$$\frac{\Delta C}{C^*_{bfc}-C^*_{avg.}}$$

where $\Delta C$ is the difference between the actual value and the desired value of said one of the vapor/liquid ratio, predetermined distillation point, and Reid vapor pressure characteristics of the motor fuel, $C^*_{bfc}$ is an ideal characteristic for the bulk fuel component varied, and $C^*_{avg.}$ is an ideal volumetric average characteristic for all other bulk fuel components forming the remaining bulk portion of the motor fuel.

10. In combination with apparatus as recited in claim 9, means for varying each of said other bulk fuel components forming the remaining bulk portion of the motor fuel in accordance with the following expression:

$$\left[\frac{(X_{bfc-n})_{old}}{(X_{sum})_{old}}\right]\times[1-(X_{bfc})_{new}]$$

where $(X_{bfc-n})_{old}$ is the present volume fraction of a particular one of said other remaining bulk fuel components, $(X_{sum})_{old}$ is the sum of the present volume fractions of all of said other remaining bulk fuel components, and $(X_{bfc})_{new}$ is the new volume fraction established for the bulk fuel component varied in accordance with the expression given in claim 9.

11. Apparatus as recited in claim 1 wherein at least two of said components are relatively bulk fuel components, wherein said means is provided for detecting at least one of the following characteristics of at least one of said bulk fuel components: vapor/liquid ratio, distillation point, and Reid vapor pressure, and wherein the control means includes means for varying the amount of said one of said bulk fuel components forming a part of th motor fuel substantially in accordance with the following expression:

$$\frac{C^*-C^*_{avg.}}{C^*_{bfc}-C^*_{avg.}}-\frac{C^m-C^m_{avg.}}{C^m_{bfc}-C^m_{avg.}}$$

where $C^*$ is an ideal characteristic for the motor fuel, $C^*_{bfc}$ is an ideal characteristic of the bulk fuel component varied, $C^*_{avg.}$ is an ideal volumetric average characteristic for all the other bulk fuel components forming the remaining bulk portion of the motor fuel, $C^m$ is the detected characteristic for the motor fuel, $C^m_{bfc}$ is the detected characteristic for the bulk fuel component varied, and $C^m_{avg.}$ is the volumetric average characteristic meausured for all the other bulk fuel components forming the remaining bulk portion of the motor fuel.

12. In combination with apparatus as recited in claim 11, means for varying each of said other bulk fuel components forming the remaining bulk portion of the motor fuel in accordance with the following expression:

$$\left[\frac{(X_{bfc-n})_{old}}{(X_{sum})_{old}}\right]\times[1-(X_{bfc})_{new}]$$

where $(X_{bfc-n})_{old}$ is the present volume fraction of a particular one of said other remaining bulk fuel components, $(X_{sum})_{old}$ is the sum of the present volume fractions of all of said other remaining bulk fuel components, and $(X_{bfc})_{new}$ is the new volume fraction established for the bulk fuel component varied in accordance with the expression given in claim 11.

13. In a method for automatically blending a motor fuel from a plurality of components, the steps comprising supplying a stream of said motor fuel to a single-cylinder internal-combustion engine performing no useful work and having a repetitive operating cycle; generating a first signal representative of the actual octane number of said motor fuel in said engine; generating a second signal representative of the desired octane number of said motor fuel; generating, in response to said first and second signals, a first error signal representative of the deviation of said first signal from said second signal; generating a third signal representative of the actual value of at least one of the following additional characteristics of said motor fuel: vapor/liquid ratio, distillation point, and Reid vapor pressure; generating a fourth signal representative of the desired value of said one additional characteristic; generating a second error signal representative of the deviation of said third signal from said fourth signal; and generating, in response to said first and second error signals, first and second control signals for varying the proportions of the components blended together so that said motor fuel meets predetermined specifications regarding octane number and said one additional characteristic.

14. In apparatus for blending motor fuels, the combination comprising
 fluid blender means,
 component conduit means for introducing a plurality of motor fuel blending components into said blender means,
 control means for adjusting the proportions of said components introduced from said conduit means to said blender,
 flow responsive means to provide a signal output representative of the flow of components to said blender,
 a single cylinder internal combustion engine having means providing a first signal output representative of the knocking propensity of the fuel powering the same,
 means for determining at least one additional characteristic of said motor fuel selected from the group consisting of vapor/liquid ratio, distillation point, and vapor pressure means, having means providing a second output signal representative of said additional characteristics,
 sample conduit means adapted to provide a sample of blended motor fuel to said engine and said means for determining the additional characteristics of the motor fuel,
 a computer means operatively responsive to said flow responsive signal output, said first signal output and said second signal output to provide a signal to said control means to modify the relative proportions of said ingredients introduced into said blender means.

15. A method for blending motor fuel which comprises
 flowing components of a fuel in their respective conduits to a blending conduit,
 generating first signals representative of the flow of said components,
 withdrawing a sample stream from the blending conduit,
 flowing a portion of the sample stream to a single cylinder automated knock test engine for detonation therein,
 generating second signals representative of the knocking propensity of the fuel in said engine,
 flowing a second portion of said sample stream to an instrument for determination of at least one additional fuel characteristic selected from the group consisting of vapor/liquid ratio, distillation point, and vapor pressure,
 generating third signals representative of said additional fuel characteristics,
 generating a signal from a computer responsive to said first, second and third signals to control the relative proportions of components flowed to said blender.

References Cited

UNITED STATES PATENTS

| | | | |
|---|---|---|---|
| 3,000,812 | 9/1961 | Boyd | 208—138 |
| 2,306,372 | 12/1942 | Banks | 73—35 |
| 2,903,417 | 9/1959 | Beaugh et al. | 208—136 |
| 3,238,765 | 3/1966 | Beal. | |
| 3,312,102 | 4/1967 | Traver. | |

OTHER REFERENCES

"The Use of Digital Computers in Petroleum Refining," by Hagler and Shea from Advances in Petroleum Chemistry and Refining, by Kobe and McKetta, Jr., Interscience Publishers, vol. 5, copyright June 20, 1962, pp. 117 to 152.

"Data Control, Special Purpose Computers in the Control of Continuous Processes," by Amber et al., from Automatic Control, vol. 7–8, May 1968, pp. 43–48.

A.S.T.M. Manual for Rating Motor Fuels by Motor and Research Methods—fourth edition—1960, pp. 43–55.

Butler, "Automatic Blending Lives Up to Goal," Petroleum Refiner, vol. 39, August 1960, pp. 97–100.

Sisk, "Automation for Gas Blending," Oil and Gas Journal, vol. 58, No. 25, June 1960, pp. 108–111.

DANIEL E. WYMAN, *Primary Examiner.*

PATRICK P. GARVIN, *Examiner.*

Y. M. HARRIS, *Assistant Examiner.*

UNITED STATES PATENT OFFICE
CERTIFICATE OF CORRECTION

Patent No. 3,385,680                                            May 28, 1968

Robert T. Feld et al.

It is certified that error appears in the above identified patent and that said Letters Patent are hereby corrected as shown below:

Column 7, line 57, "blend" should read -- blended --. Column 8, lines 20 to 22, the portion of the formula reading "$L_{gcw}$" should read -- $L_{new}$ --; line 28, "compleetely" should read -- completely --; line 48, "octance" should read -- octane --. Column 11, lines 58 to 60, the portion of the formula reading "$V/L)_c$" should read -- $(V/L)_c$ --; lines 64 to 66, the portion of the formula reading "$(V/L)_c^*$" should read -- $(V/L)^*$ --. Column 12, lines 29 and 30, "product" should read -- produce --. Column 25, line 40, "$(V/L)_{avg.\ a,r,b}$" should read -- $(V/L)^*_{avg.\ a,r,b}$ --. Column 26, line 2, after "to", first occurrence, insert -- be --. Column 29, line 12, "attenuatition" should read -- attenuation --; line 70, "3350" should read -- 350 --. Column 31, line 9, "Turing" should read -- Turning --; line 34, "on" should read -- in --. Column 32, line 29, "re-" should read -- rewritten as follows: --. Column 33, line 47, "There" should read -- These --; line 64, "Requirements" should read -- Requirement --. Column 35, line 8, "demand" should read -- deemed --; line 28, "froms aid" should read -- from said --. Column 36, line 41, cancel "said"; line 46, "th" should read -- the --.

Signed and sealed this 10th day of March 1970.

(SEAL)
Attest:

EDWARD M. FLETCHER, JR.                              WILLIAM E. SCHUYLER, JR.
Attesting Officer                                            Commissioner of Patents